United States Patent
Govindan et al.

(12)

(10) Patent No.: US 12,553,883 B2
(45) Date of Patent: *Feb. 17, 2026

(54) METHODS AND USES OF MICROBIOME COMPOSITIONS

(71) Applicant: MarvelBiome, Inc., Woburn, MA (US)

(72) Inventors: Jothi Amaranath Govindan, Malden, MA (US); Elamparithi Jayamani, Melrose, MA (US); Priti H. Chatter, Concord, MA (US); Mukesh Chatter, Concord, MA (US)

(73) Assignee: MarvelBiome, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,189

(22) Filed: Sep. 10, 2021

(65) Prior Publication Data

US 2022/0082552 A1 Mar. 17, 2022

Related U.S. Application Data

(60) Provisional application No. 63/077,544, filed on Sep. 11, 2020.

(51) Int. Cl.
| | |
|---|---|
| *G01N 33/50* | (2006.01) |
| *A61K 35/74* | (2015.01) |
| *C12N 1/20* | (2006.01) |
| *G01N 27/44* | (2006.01) |
| *G01N 27/447* | (2006.01) |

(52) U.S. Cl.
CPC ........... *G01N 33/5038* (2013.01); *C12N 1/20* (2013.01); *G01N 27/4473* (2013.01); *A61K 35/74* (2013.01)

(58) Field of Classification Search
None
See application file for complete search history.

(56) References Cited

U.S. PATENT DOCUMENTS

| | | | |
|---|---|---|---|
| 2008/0193595 A1* | 8/2008 | De Vuyst | C12P 39/00 426/631 |
| 2011/0189132 A1 | 8/2011 | Garner et al. | |
| 2016/0271188 A1 | 9/2016 | Berry et al. | |
| 2017/0151291 A1 | 6/2017 | Henn et al. | |
| 2018/0279647 A1* | 10/2018 | Burch | A23K 50/30 |
| 2019/0192581 A1 | 6/2019 | von Maltzahn et al. | |
| 2022/0248644 A1* | 8/2022 | Karpol | A01K 45/007 |
| 2025/0123271 A1 | 4/2025 | Govindan et al. | |

FOREIGN PATENT DOCUMENTS

| | | |
|---|---|---|
| RU | 2491081 C2 | 8/2013 |
| WO | WO-2015/077794 A1 | 5/2015 |
| WO | WO-2018/117263 A1 | 6/2018 |
| WO | WO-2019/046646 A1 | 3/2019 |
| WO | WO-2019/089643 A1 | 5/2019 |
| WO | WO-2020/079026 A1 | 4/2020 |
| WO | WO-2020/096992 A1 | 5/2020 |
| WO | WO-2021/074239 A1 | 4/2021 |
| WO | WO-2022/056275 A1 | 3/2022 |

OTHER PUBLICATIONS

Fenster et al. A Review of a Practical Approach. Microorganisms. Mar. 17, 2019;7(3):83 pp. 1-17.*
Syuhadah et al. International Journal of Infectious Diseases, vol. 101, Supplement 1, Dec. 2020, p. 151.*
Fijan, Sabina, Microorganisms with claimed probiotic properties: an overview of recent literature, Int J Environ Res Public Health, 11(5):4745-67 (2014).
Gonnet, G.H. et al., Exhaustive matching of the entire protein sequence database, Science, 256(5062):1443-5 (1992).
Hutkins, R. W. et al., Prebiotics: why definitions matter, Curr Opin Biotechnol, 37:1-7 (2016).
International Search Report for PCT/US2021/049885, 3 pages (Dec. 20, 2021).
Written Opinion for PCT/US2021/049885, 5 pages (Dec. 20, 2021).
Dirks, P.B., Brain tumor stem cells: bringing order to the chaos of brain cancer, J Clin Oncol. 26(17):2916-24 (2008).
López-Lázaro, M., The migratio ability of stem cells can explain the existence of cancer of unknown primary site. Rethinking metastsis, Oncoscience, 2(5):467-475 (2015).
Mabey, D., Epidemiology of sexually transmitted infections: worldwide, Medicine 42(6): 287-90 (2014).
Oganova, R.G., et al., Osnovy dokazatelnoj mediciny. Uchebnoe posobie dlya sistemy poslevuzovskogo i dopolnitelnogo obrazovaniya vrachj. / pod obshej redakciej akademika RAMS, M:Siliceya-Poligraf, p. 11-12 (2010). (Non-English).
Ouwehand, A.C., A review of dose-responses of probiotics in human studies, Benef Microbes. 8(2):143-151 (2017).
Tran, B. and Rosenthal, M.A., Survival comparison between glioblastoma multiforme and other incurable cancers, Jrnl. Clin. Neueosci., 17(4):417-421 (2010).

* cited by examiner

*Primary Examiner* — Oluwatosin A Ogunbiyi
(74) *Attorney, Agent, or Firm* — Choate, Hall & Stewart LLP; Stephanie L. Schonewald; Sowmya Subramanian

(57) ABSTRACT

Methods and uses of compositions (e.g. comprising one or more microbial strains) are disclosed.

10 Claims, 42 Drawing Sheets

| Metabolite Name | % change compared to untreated control | Metabolite levels in bacterial cell pellet and spent media combined | | | |
|---|---|---|---|---|---|
| | | Gluconacetobacter hansenii | Terrisporobacter glycolicus | Coprococcus sp. | Lactobacillus plantarum |
| 5-Aminovaleric acid | only detected in CT10-treated animals | 0.00000 | 0.00000 | 1.07419 | 0.00000 |
| Picolinic acid | only detected in CT10-treated animals | 0.00008 | 0.00000 | 0.00000 | 0.00035 |
| Propionic acid | only detected in CT10-treated animals | 0.00000 | 0.00281 | 0.05490 | 0.00283 |
| Isobutyric acid Butyric acid | only detected in CT10-treated animals | 0.00295 | 0.01041 | 0.08249 | 0.00071 |
| 2-Hydroxyisobutyric acid | only detected in CT10-treated animals | 0.00000 | 0.00000 | 0.00000 | 0.00012 |
| 2-Hydroxy-4-methylvaleric acid | only detected in CT10-treated animals | 0.00059 | 0.11604 | 0.06462 | 0.03578 |
| XA0017 | only detected in CT10-treated animals | 0.00023 | 0.00006 | 0.00051 | 0.00008 |
| trans-Cinnamic acid | only detected in CT10-treated animals | 0.00000 | 0.00018 | 0.00013 | 0.00050 |
| N6-Acetyllysine | only detected in CT10-treated animals | 0.00119 | 0.00939 | 0.00463 | 0.02075 |
| S-Methylmethionine | only detected in CT10-treated animals | n.d. | n.d. | n.d. | n.d. |

FIG. 1

Table 1

| Metabolite levels in bacterial cell pellet and spent media combined | | | | | | |
|---|---|---|---|---|---|---|
| Clostridium butyricum | Paenibacillus barengoltzii | Veillonella sp | Bifidobacterium sp | Bacillus subtilis | Acidaminococcus sp |
| 0.00061 | 0.00200 | 0.00000 | 0.00000 | 0.00298 | 0.00052 |
| 0.00000 | 0.00000 | 0.00008 | 0.00009 | 0.00000 | 0.00007 |
| 0.00141 | 0.02646 | 0.02557 | 0.00351 | 0.00159 | 0.09002 |
| 2.08033 | 0.04266 | 0.00721 | 0.00317 | 0.00292 | 0.43531 |
| 0.00000 | 0.00000 | 0.00000 | 0.00000 | 0.00000 | 0.00000 |
| 0.20729 | 0.14980 | 0.03648 | 0.16798 | 0.00090 | 0.00533 |
| 0.00008 | 0.00019 | 0.00008 | 0.00011 | 0.00023 | 0.00145 |
| 0.00037 | 0.00000 | 0.00000 | 0.00084 | 0.00000 | 0.00000 |
| 0.00342 | 0.00358 | 0.00390 | 0.01891 | 0.05575 | 0.00531 |
| n.d. | n.d. | n.d. | n.d. | n.d. | n.d. |

FIG. 1 (Contd.)

| GABA | only detected in CT10-treated animals | 0.02876 | 0.14129 | 0.09114 | 0.08103 |
|---|---|---|---|---|---|
| Cholic acid | 591.1% | 0.00008 | 0.00011 | 0.00005 | 0.00017 |
| Phenylpyruvic acid | 237.7% | 0.00000 | 0.00000 | 0.00000 | 0.00000 |
| Glyoxylic acid | 205.3% | n.d. | n.d. | n.d. | n.d. |
| Azelaic acid | 185.5% | 0.00019 | 0.00035 | 0.00020 | 0.00022 |
| Homoserine | 166.1% | 0.00416 | 0.00588 | 0.00334 | 0.00383 |
| Pyridoxal | 136.9% | 0.00000 | 0.00000 | 0.00000 | 0.00000 |
| 4-Guanidinobutyric acid | 135.0% | 0.00260 | 0.00150 | 0.00224 | 0.00345 |
| o-Hydroxybenzoic acid | 128.0% | 0.00025 | 0.00000 | 0.00000 | 0.00030 |
| Diethanolamine | 99.5% | 0.00167 | 0.00117 | 0.00141 | 0.00085 |
| Urocanic acid | 84.5% | 0.00000 | 0.00005 | 0.03090 | 0.00000 |
| Methionine sulfoxide | 84.1% | 0.01170 | 0.04189 | 0.05285 | 0.04411 |
| Pyruvic acid | 80.1% | 0.00000 | 0.01268 | 0.00691 | 0.01724 |
| XC0001 | 79.6% | 0.00010 | 0.00038 | 0.00035 | 0.00055 |
| Hypotaurine | 65.4% | 0.00027 | 0.00080 | 0.00012 | 0.00013 |
| Decanoic acid | 64.3% | 0.00036 | 0.00080 | 0.00026 | 0.00000 |
| 3-Indoxylsulfuric acid | 60.2% | n.d. | n.d. | n.d. | n.d. |
| Ectoine | 57.9% | 0.00013 | 0.00000 | 0.00008 | 0.00030 |
| N5-Ethylglutamine | 56.8% | 0.00029 | 0.00089 | 0.00103 | 0.00108 |
| Glycerol | 53.8% | 0.17245 | 0.19986 | 0.22248 | 0.17549 |

FIG. 1 (Contd.)

Table 1

| | | | | | |
|---|---|---|---|---|---|
| 0.09253 | 0.05143 | 0.09266 | 0.33699 | 0.01066 | 0.04811 |
| 0.00027 | 0.00000 | 0.00013 | 0.00019 | 0.00000 | 0.00008 |
| 0.00011 | 0.00017 | 0.00000 | 0.00000 | 0.00022 | 0.00127 |
| n.d. | n.d. | n.d. | n.d. | n.d. | n.d. |
| 0.00020 | 0.00013 | 0.00018 | 0.00029 | 0.00027 | 0.00014 |
| 0.01005 | 0.00192 | 0.00893 | 0.00642 | 0.00204 | 0.00442 |
| 0.00000 | 0.00063 | 0.00003 | 0.00004 | 0.00000 | 0.00000 |
| 0.00195 | 0.00170 | 0.00148 | 0.00167 | 0.00249 | 0.00435 |
| 0.00000 | 0.00000 | 0.00000 | 0.00029 | 0.00000 | 0.00000 |
| 0.00170 | 0.00140 | 0.00191 | 0.00139 | 0.00092 | 0.00072 |
| 0.00015 | 0.11477 | 0.00027 | 0.00000 | 0.04010 | 0.00140 |
| 0.04981 | 0.02290 | 0.05977 | 0.03252 | 0.02257 | 0.04281 |
| 0.05193 | 0.00101 | 0.00755 | 0.02857 | 0.00744 | 0.00000 |
| 0.00052 | 0.00000 | 0.00042 | 0.00048 | 0.00004 | 0.00022 |
| 0.00095 | 0.00065 | 0.00099 | 0.00062 | 0.00010 | 0.00004 |
| 0.00407 | 0.00020 | 0.00053 | 0.00016 | 0.00019 | 0.00018 |
| n.d. | n.d. | n.d. | n.d. | n.d. | n.d. |
| 0.00009 | 0.00173 | 0.00010 | 0.00013 | 0.00167 | 0.00008 |
| 0.00122 | 0.00307 | 0.16774 | 0.00110 | 0.01024 | 0.00095 |
| 0.27560 | 0.15032 | 0.19434 | 0.16239 | 0.15141 | 0.12286 |

FIG. 1 (Contd.)

| | | | | |
|---|---|---|---|---|
| Betaine | 47.1% | 0.09776 | 0.29191 | 0.35030 | 0.18069 |
| Stachydrine | 46.3% | 0.00010 | 0.00005 | 0.00008 | 0.00017 |
| Met | 41.5% | 0.07277 | 0.50439 | 0.32752 | 0.04406 |
| 5-Hydroxylysine | 40.8% | 0.00122 | 0.01397 | 0.01834 | 0.00481 |
| Hydroxyproline | 38.7% | 0.00142 | 0.03537 | 0.01216 | 0.00926 |
| Trigonelline | 38.6% | 0.00097 | 0.00205 | 0.00224 | 0.00328 |
| Malic acid | 36.1% | 0.00313 | 0.00228 | 0.01787 | 0.09268 |
| p-Hydroxyphenylpyruvic acid | 34.4% | n.d. | n.d. | n.d. | n.d. |
| Pro | 33.6% | 0.10975 | 0.28100 | 0.02010 | 0.17698 |
| IMP | 33.0% | 0.00026 | 0.00037 | 0.00036 | 0.00403 |
| Homocitrulline | 29.6% | 0.00041 | 0.00092 | 0.00121 | 0.00146 |
| Trimethylamine N-oxide | 29.6% | 0.00019 | 0.00010 | 0.00012 | 0.00020 |
| Butyrylcarnitine | 29.2% | n.d. | n.d. | n.d. | n.d. |
| 2,6-Diaminopimelic acid | 29.0% | 0.00215 | 0.00139 | 0.00005 | 0.02365 |
| N6-Methyllysine | 28.8% | 0.00036 | 0.00030 | 0.00032 | 0.00066 |
| Asn | 27.9% | 0.09897 | 0.29487 | 0.01324 | 0.07872 |
| Kynurenine | 27.2% | 0.00000 | 0.00071 | 0.00000 | 0.00000 |
| XA0004 | 26.5% | 0.00018 | 0.00060 | 0.00082 | 0.00039 |
| Glycerophosphocholine | 25.7% | 0.03761 | 0.05361 | 0.06223 | 0.05433 |
| Gly | 24.4% | 0.17726 | 0.382897 | 0.7107926 | 0.23225 |
| Hexanoic acid | 22.1% | 0.00000 | 0.001115 | 0.00211404 | 0.00048 |

FIG. 1 (Contd.)

Table 1

| | | | | | |
|---|---|---|---|---|---|
| 0.36339 | 0.06577 | 0.36979 | 0.34138 | 0.09449 | 0.18707 |
| 0.00005 | 0.00017 | 0.00007 | 0.00089 | 0.00033 | 0.00000 |
| 0.66408 | 0.28919 | 0.81483 | 0.23534 | 0.29260 | 0.27848 |
| 0.01765 | 0.00040 | 0.02309 | 0.00343 | 0.00032 | 0.01066 |
| 0.04539 | 0.00088 | 0.04697 | 0.00365 | 0.00058 | 0.02303 |
| 0.00284 | 0.00535 | 0.00294 | 0.00542 | 0.00643 | 0.00126 |
| 0.01872 | 0.00205 | 0.02486 | 0.07638 | 0.00922 | 0.00598 |
| n.d. | n.d. | n.d. | n.d. | n.d. | n.d. |
| 0.39286 | 0.25086 | 0.46953 | 0.36573 | 0.06227 | 0.27601 |
| 0.00000 | 0.00006 | 0.00062 | 0.00078 | 0.00006 | 0.00019 |
| 0.00125 | 0.00130 | 0.00149 | 0.00173 | 0.00096 | 0.00019 |
| 0.00014 | 0.00017 | 0.00010 | 0.00013 | 0.00014 | 0.00008 |
| n.d. | n.d. | 0.00000 | 0.07669 | n.d. | n.d. |
| 0.00523 | 0.04161 | 0.00031 | 0.00028 | 0.00867 | 0.00010 |
| 0.00025 | 0.00041 | 0.52320 | 0.29737 | 0.00026 | 0.00027 |
| 0.34449 | 0.05146 | 0.00058 | 0.00036 | 0.11898 | 0.01433 |
| 0.00052 | 0.00177 | 0.00086 | 0.00034 | 0.00014 | 0.00000 |
| 0.00090 | 0.00029 | 0.10396 | 0.12885 | 0.00027 | 0.00014 |
| 0.06357 | 0.00012 | 0.66574 | 0.51445 | 0.00019 | 0.03574 |
| 0.460206 | 0.259038 | 0.10396 | 0.00061 | 0.19891 | 0.417483 |
| 0.00205 | 0.000905 | 0.001453 | | 0.00123 | 0.001723 |

FIG. 1 (Contd.)

| | | | | |
|---|---|---|---|---|
| Pipecolic acid | 21.8% | 0.00777 | 0.00624 | 0.00879 | 0.00640 |
| Phenaceturic acid | 21.5% | 0.00024 | 0.00052 | 0.00070 | 0.00128 |
| S-Sulfocysteine | 21.1% | 0.00000 | 0.00000 | 0.00000 | 0.00011 |
| Glucaric acid | 21.1% | 0.00000 | 0.00000 | 0.00000 | 0.00159 |
| Dyphylline | 21.0% | 0.00192 | 0.00259 | 0.01835 | 0.00302 |
| Val | 20.9% | 0.02672 | 0.09027 | 0.09898 | 0.03241 |
| 5-Methoxyindoleacetic acid Indole-3-lactic acid | 20.4% | 0.00004 | 0.00307 | 0.00670 | 0.00829 |
| His | 20.3% | 0.07913 | 0.29797 | 0.50747 | 0.04798 |
| Phe | 19.7% | 0.04975 | 0.17731 | 0.21625 | 0.04833 |
| Ethanolamine | 19.0% | 0.00361 | 0.00802 | 0.00992 | 0.01219 |
| Tyr | 18.7% | 0.10857 | 0.37466 | 0.51759 | 0.17201 |
| Thr | 18.3% | 0.26810 | 0.50166 | 0.00495 | 0.19056 |
| Ile | 18.0% | 0.02946 | 0.09804 | 0.09610 | 0.03489 |
| Ser | 17.3% | 0.19164 | 0.02867 | 0.01837 | 0.02176 |
| Leu | 16.6% | 0.06683 | 0.29520 | 0.31418 | 0.08661 |
| Trp | 16.4% | 0.08652 | 0.37649 | 0.49590 | 0.07643 |
| SDMA | 16.4% | 0.00008 | 0.00004 | 0.00009 | 0.00014 |
| Carnitine | 16.4% | 0.00355 | 0.06775 | 0.08158 | 0.15160 |
| N-Acetylglutamic acid | 16.2% | 0.00154 | 0.00147 | 0.00173 | 0.00141 |
| Octanoic acid | 16.1% | 0.00000 | 0.00068 | 0.00155 | 0.00000 |

FIG. 1 (Contd.)

Table 1

| 0.00738 | 0.00499 | 0.00736 | 0.01219 | 0.00282 | 0.00504 |
|---|---|---|---|---|---|
| 0.00129 | 0.00033 | 0.00023 | 0.00041 | 0.00056 | 0.00007 |
| 0.00000 | 0.00015 | 0.00000 | 0.00000 | 0.00000 | 0.00000 |
| 0.00000 | 0.00231 | 0.00000 | 0.00235 | 0.00242 | 0.00000 |
| 0.00321 | 0.00118 | 0.00184 | 0.00082 | 0.00030 | 0.01576 |
| 0.11134 | 0.06509 | 0.13745 | 0.06607 | 0.07307 | 0.07690 |
| 0.00041 | 0.00035 | 0.00042 | 0.01257 | 0.00000 | 0.00006 |
| 0.39782 | 0.07547 | 0.51291 | 0.16935 | 0.28591 | 0.00517 |
| 0.18893 | 0.14966 | 0.19670 | 0.10499 | 0.15260 | 0.12720 |
| 0.01083 | 0.01051 | 0.01098 | 0.01672 | 0.00821 | 0.00533 |
| 0.47334 | 0.36538 | 0.00252 | 0.23801 | 0.25864 | 0.29491 |
| 0.75766 | 0.08501 | 1.03688 | 0.43356 | 0.50972 | 0.01067 |
| 0.11933 | 0.06113 | 0.15174 | 0.07377 | 0.07250 | 0.08457 |
| 0.52597 | 0.01053 | 0.51926 | 0.04364 | 0.00000 | 0.02024 |
| 0.35614 | 0.21605 | 0.43338 | 0.17736 | 0.24959 | 0.22242 |
| 0.49994 | 0.20527 | 0.53663 | 0.19274 | 0.28128 | 0.29206 |
| 0.00004 | 0.00005 | 0.00006 | 0.00007 | 0.00000 | 0.00005 |
| 0.08664 | 0.00058 | 0.24755 | 0.02383 | 0.00259 | 0.05590 |
| 0.00145 | 0.00313 | 0.00147 | 0.00226 | 0.00108 | 0.00019 |
| 0.00184 | 0.00031 | 0.00056 | 0.00012 | 0.00043 | 0.00011 |

FIG. 1 (Contd.)

| | | | | | |
|---|---|---|---|---|---|
| Choline | 14.3% | 0.09861 | 0.07624 | 0.09484 | 0.05763 |
| Quinic acid | 14.2% | 0.00000 | 0.00022 | 0.00034 | 0.00065 |
| N-Acetyltryptophan | 13.8% | 0.00006 | 0.00000 | 0.00000 | 0.00029 |
| Creatine | 12.7% | 0.01138 | 0.05199 | 0.06881 | 0.10774 |
| Lactic acid | 12.1% | 0.00065 | 0.27126 | 0.01432 | 0.38458 |
| Ala | 11.5% | 0.01476 | 0.03863 | 0.16193 | 0.01454 |
| β-Ala | 11.3% | 0.00134 | 0.00563 | 0.04692 | 0.00563 |
| XC0061 | 10.6% | n.d | n.d | n.d | n.d |
| Pantothenic acid | 10.3% | 0.00078 | 0.00000 | 0.00000 | 0.00054 |
| 4-Pyridoxic acid (pyradoxamine) | 9.5% | 0.00013 | 0.00000 | 0.00000 | 0.00110 |
| 1-Methylhistidine | 9.2% | 0.00058 | 0.00055 | 0.00089 | 0.00198 |
| Dihydrothymine | 8.6% | 0.00150 | 0.00630 | 0.00742 | 0.00449 |
| Xa0019 | 8.4% | 0 | 0.00000 | 0.00000 | 0.00000 |
| Creatinine | 8.1% | 0.02486 | 0.09091 | 0.09625 | 0.22776 |
| "4-Methyl-2-oxovaleric acid 3-Methyl-2-oxovaleric acid" | 8.0% | n.d | n.d | n.d | n.d |
| 2-Oxoisovaleric acid | 6.8% | 0.00000 | 0.00000 | 0.00177 | 0.00000 |

FIG. 1 (Contd.)

Table 1

| | | | | | |
|---|---|---|---|---|---|
| 0.02967 | 0.11256 | 0.11915 | 0.13550 | 0.11917 | 0.05481 |
| 0.00031 | 0.00006 | 0.00000 | 0.00072 | 0.00006 | 0.00000 |
| 0.00000 | 0.00000 | 0.00000 | 0.00021 | 0.00011 | 0.00000 |
| 0.07413 | 0.00028 | 0.07030 | 0.03201 | 0.00044 | 0.03551 |
| 0.06209 | 0.00369 | 0.34753 | 0.55269 | 0.00587 | 0.00711 |
| 0.05595 | 0.02647 | 0.05686 | 0.03244 | 0.02584 | 0.04121 |
| 0.01213 | 0.00849 | 0.00765 | 0.00426 | 0.00317 | 0.01740 |
| n.d | n.d | n.d | n.d | n.d | n.d |
| 0.00010 | 0.00112 | 0.00000 | 0.00055 | 0.00073 | 0.00000 |
| 0.00000 | 0.00000 | 0.00000 | 0.00029 | 0.00000 | 0.00000 |
| 0.00081 | 0.00018 | 0.00115 | 0.00200 | 0.00010 | 0.00142 |
| 0.00779 | 0.00494 | 0.00792 | 0.00628 | 0.00529 | 0.00416 |
| 0.00000 | 0.00000 | 0.00018 | 0.00000 | 0.00000 | 0.00000 |
| 0.10322 | 0.00067 | 0.11626 | 0.04804 | 0.00062 | 0.05680 |
| n.d | n.d | n.d | n.d | n.d | n.d |
| 0.00036 | 0.00108 | 0.00000 | 0.00000 | 0.00077 | 0.00000 |

FIG. 1 (Contd.)

| | | | | |
|---|---|---|---|---|
| 3,4-Dihydroxyhydrocinnamic acid | 6.7% | 0.00008 | 0.00949 | 0.01301 | 0.04852 |
| Homovanillic acid | 6.6% | 0.00187 | 0.00121 | 0.16953 | 0.00456 |
| Hydroxyphenyllactic acid | 6.0% | 0.11266 | 0.97250 | 0.83356 | 0.08740 |
| Urea | 5.0% | 0.00000 | 0.00478 | 0.00587 | 0.00252 |
| Arg | 4.8% | n.d | n.d | n.d | n.d |
| Sarcosine | 4.7% | 0.28021 | 1.05653 | 1.52940 | 0.22539 |
| N,N-Dimethylglycine | 4.4% | 0.00020 | 0.00057 | 0.00070 | 0.00241 |
| Glu | 4.3% | 0.00028 | 0.00448 | 0.00271 | 0.00090 |
| N-Acetylaspartic acid | 4.0% | 0.00384 | 0.01304 | 0.01679 | 0.00341 |
| N8-Acetylspermidine | 3.9% | 0.00036 | 0.01785 | 0.04943 | 0.01752 |
| Citrulline | 3.6% | 0.00453826 | 0.03021 | 0.01964 | 0.02481 |
| 2-Hydroxyvaleric acid | 2.7% | n.d | n.d | n.d | n.d |
| Gln | 1.6% | n.d | n.d | n.d | n.d |
| Theobromine | 1.2% | 0.00186 | 0.00288 | 0.00211 | 0.00000 |
| 1-Methylnicotinamide | 0.6% | 0.00022 | 0.00008 | 0.00021 | 0.00034 |
| Taurine | 0.3% | 0.00003 | 0.00000 | 0.00000 | 0.00000 |
| N-Acetylphenylalanine | 0.2% | n.d | n.d | n.d | n.d |
| Argininosuccinic acid | | | | | |
| Phosphocreatine | | | | | |

FIG. 1 (Contd.)

Table 1

| | | | | | |
|---|---|---|---|---|---|
| 0.00265 | 0.00363 | 0.00071 | 0.05728 | 0.00000 | 0.00000 |
| 0.00191 | 0.00213 | 0.00161 | 0.01748 | 0.28650 | 0.00000 |
| 1.17334 | 0.00218 | 0.00657 | 0.47660 | 0.06352 | 0.56089 |
| 0.00490 | 0.00000 | 0.00663 | 0.00000 | 0.00000 | 0.00214 |
| n.d | n.d | n.d | n.d | n.d | n.d |
| 1.53627 | 0.34518 | 1.71142 | 0.79292 | 0.24307 | 0.02681 |
| 0.00042 | 0.00044 | 0.00324 | 0.00194 | 0.00022 | 0.00018 |
| 0.00000 | 0.00000 | 0.00303 | 0.00363 | 0.00004 | 0.00092 |
| 0.01842 | 0.00000 | 0.39942 | 0.01526 | 0.00927 | 0.01136 |
| 0.01423 | 0.01828 | 0.00832 | 0.02462 | 0.00117 | 0.00188 |
| 0.00356 | 0.06653 | 0.02499 | 0.03642 | 0.03947 | 0.00016 |
| n.d | n.d | n.d | n.d | n.d | n.d |
| n.d | n.d | n.d | n.d | n.d | n.d |
| 0.00360 | 0.00000 | 0.00280 | 0.00000 | 0.00000 | 0.00000 |
| 0.00015 | 0.00031 | 0.00012 | 0.00023 | 0.00016 | 0.00087 |
| 0.00000 | 0.00010 | 0.00005 | 0.00000 | 0.00013 | 0.00006 |
| n.d | n.d | n.d | n.d | n.d | n.d |

FIG. 1 (Contd.)

| Metabolite Name | % change compared to untreated control | Metabolite levels in bacterial cell pellet and spent media combined | | |
|---|---|---|---|---|
| | | Gluconacetobacter hansenii | Terrisporobacter glycolicus | Coprococcus sp. |
| S-Methylglutathione | only detected in CT10-treated animals | 0.00000 | 0.00000 | 0.00000 |
| XC0120 | only detected in CT10-treated animals | 0.00012 | 0.00087 | 0.00000 |
| 6-Aminohexanoic acid | only detected in CT10-treated animals | n.d. | n.d. | n.d. |
| Xanthosine | only detected in CT10-treated animals | 0.00000 | 0.00015 | 0.00007 |
| Homoserine | only detected in CT10-treated animals | 0.00446 | 0.00588 | 0.00334 |
| Taurocholic acid | 489.3% | 0.00000 | 0.00000 | 0.00000 |
| Pyruvic acid | 478.9% | 0.00000 | 0.01268 | 0.00691 |
| Glycocholic acid | 403.6% | 0.00007 | 0.00000 | 0.00000 |
| XA0017 | 356.0% | 0.00023 | 0.00006 | 0.00051 |
| Quinic acid | 335.4% | 0.00000 | 0.00022 | 0.00034 |
| Cysteine glutathione disulfide | 226.8% | 0.00039 | 0.00154 | 0.00017 |
| N8-Acetylspermidine | 215.7% | 0.00028 | 0.00448 | 0.00271 |
| N-Acetylhistidine | 210.7% | 0.00005 | 0.00055 | 0.00146 |

FIG. 2

Table 2

| Metabolite levels in bacterial cell pellet and spent media combined | | | | | | |
|---|---|---|---|---|---|---|
| Lactobacillus plantarum | Clostridium butyricum | Paenibacillus barengoltzii | Veillonella sp | Bifidobacterium sp | Bacillus subtilis | Acidaminococcus sp. |
| 0.00000 | 0.00000 | 0.00000 | 0.00010 | 0.00000 | 0.00000 | 0.00000 |
| 0.00000 | 0.00000 | 0.00000 | 0.00032 | 0.00000 | 0.00000 | 0.00000 |
| n.d. | n.d. | n.d. | n.d. | n.d. | n.d. | n.d. |
| 0.00000 | 0.00019 | 0.00007 | 0.00016 | 0.00006 | 0.00021 | 0.00012 |
| 0.00383 | 0.01005 | 0.00192 | 0.00893 | 0.00642 | 0.00204 | 0.00442 |
| 0.00000 | 0.00026 | 0.00004 | 0.00017 | 0.00000 | 0.00004 | 0.00020 |
| 0.01724 | 0.05193 | 0.00101 | 0.00755 | 0.02857 | 0.00744 | 0.00000 |
| 0.00000 | 0.00000 | 0.00000 | 0.00000 | 0.00000 | 0.00000 | 0.00009 |
| 0.00008 | 0.00008 | 0.00019 | 0.00008 | 0.00011 | 0.00023 | 0.00145 |
| 0.00065 | 0.00031 | 0.00006 | 0.00000 | 0.00072 | 0.00006 | 0.00000 |
| 0.00000 | 0.00090 | 0.00005 | 0.00479 | 0.00003 | 0.00000 | 0.00000 |
| 0.00090 | 0.00000 | 0.00029 | 0.00303 | 0.00363 | 0.00004 | 0.00092 |
| 0.00155 | 0.00118 | 0.00078 | 0.00056 | 0.00156 | 0.00013 | 0.00000 |

FIG. 2 (Cont'd.)

| | | | |
|---|---|---|---|
| trans-Cinnamic acid | 208.2% | 0.00000 | 0.00018 | 0.00013 |
| 10-Hydroxydecanoic acid | 192.6% | 0.00016 | 0.00027 | 0.00005 |
| N1-Methyl-4-pyridone-5- | 192.2% | n.d. | n.d. | n.d. |
| Phenaceturic acid | 152.4% | 0.00024 | 0.00052 | 0.00070 |
| Cystine | 143.3% | 0.00101 | 0.05744 | 0.00047 |
| N-Acetylalanine | 116.1% | 0.00170 | 0.00369 | 0.00909 |
| 1-Methylnicotinamide | 113.6% | n.d. | n.d. | n.d. |
| 2-Hydroxyisobutyric acid | 89.9% | 0.00000 | 0.00000 | 0.00000 |
| Decanoic acid | 86.5% | 0.00036 | 0.00080 | 0.00026 |
| 3-Hydroxybutyric acid | 85.8% | 0.00149 | 0.00175 | 0.00079 |
| Argininosuccinic acid | 80.4% | 0.00003 | 0.00000 | 0.00000 |
| Histamine | 70.0% | 0.00161 | 0.00030 | 0.00037 |
| Cholic acid | 68.8% | 0.00008 | 0.00011 | 0.00005 |
| Glutathione (GSSG)_divalent | 67.8% | 0.00015 | 0.00000 | 0.00000 |
| Glucuronic acid Galacturonic acid | 49.4% | 0.01893 | 0.00038 | 0.00000 |
| N-Acetylgalactosamine N-Acetylmannosamine N-Acetylglucosamine | 49.0% | 0.00014 | 0.00000 | 0.00000 |
| p-Hydroxyphenylpyruvic acid | 42.9% | n.d. | n.d. | n.d. |
| N-Acetylglycine | 41.6% | 0.00028 | 0.01546 | 0.00132 |

FIG. 2 (Contd.)

Table 2

| | | | | | | |
|---|---|---|---|---|---|---|
| 0.00050 | 0.00037 | 0.00000 | 0.00000 | 0.00084 | 0.00000 | 0.00000 |
| 0.00083 | 0.00008 | 0.00000 | 0.00027 | 0.00109 | 0.00000 | 0.00000 |
| n.d. | n.d. | n.d. | n.d. | n.d. | n.d. | n.d. |
| 0.00128 | 0.00129 | 0.00033 | 0.00023 | 0.00041 | 0.00056 | 0.00057 |
| 0.00000 | 0.01989 | 0.00015 | 0.04395 | 0.00000 | 0.00005 | 0.00236 |
| 0.00217 | 0.00353 | 0.00119 | 0.00260 | 0.00400 | 0.00129 | 0.00195 |
| n.d. | n.d. | n.d. | n.d. | n.d. | n.d. | n.d. |
| 0.00012 | 0.00000 | 0.00000 | 0.00000 | 0.00000 | 0.00000 | 0.00000 |
| 0.00000 | 0.00407 | 0.00020 | 0.00053 | 0.00016 | 0.00019 | 0.00018 |
| 0.00475 | 0.00393 | 0.00490 | 0.00104 | 0.00853 | 0.00041 | 0.00111 |
| 0.00000 | 0.00000 | 0.00010 | 0.00005 | 0.00000 | 0.00013 | 0.00006 |
| 0.00101 | 0.00039 | 0.00023 | 0.00043 | 0.00174 | 0.00004 | 0.00006 |
| 0.00017 | 0.00027 | 0.00000 | 0.00013 | 0.00019 | 0.00000 | 0.00008 |
| 0.00000 | 0.00002 | 0.00002 | 0.00077 | 0.00077 | 0.00000 | 0.00000 |
| 0.00000 | 0.00012 | 0.00000 | 0.00083 | 0.00000 | 0.00000 | 0.00011 |
| 0.00063 | 0.00000 | 0.00005 | 0.00006 | 0.00052 | 0.00025 | 0.00004 |
| n.d. | n.d. | n.d. | n.d. | n.d. | n.d. | n.d. |
| 0.00156 | 0.00064 | 0.00031 | 0.00062 | 0.00511 | 0.00000 | 0.00092 |

FIG. 2 (Contd.)

| | | | | |
|---|---|---|---|---|
| 2-Oxoisovaleric acid | 41.5% | 0.00000 | 0.00000 | 0.00177 |
| Thiamine | 41.5% | 0.00015 | 0.00009 | 0.00000 |
| Glucaric acid | 39.3% | 0.00000 | 0.00000 | 0.00000 |
| 1-Methylhistidine | 34.1% | 0.00058 | 0.00055 | 0.00089 |
| Malic acid | 33.5% | 0.00313 | 0.00228 | 0.01787 |
| 4-Methyl-2-oxovaleric acid 3-Methyl-2-oxovaleric acid | 33.2% | n.d. | n.d. | n.d. |
| Glyoxylic acid | 32.5% | n.d. | n.d. | n.d. |
| N,N-Dimethylglycine | 30.5% | n.d. | n.d. | n.d. |
| Isovalerylalanine N-Acetylleucine | 29.3% | 0.00092 | 0.00134 | 0.00332 |
| Uric acid | 28.7% | 0.00015 | 0.00236 | 0.00277 |
| Pipecolic acid | 28.1% | 0.00777 | 0.00624 | 0.00879 |
| 3-Indoxylsulfuric acid | 27.3% | n.d. | n.d. | n.d. |
| Arg | 26.4% | 0.11266 | 0.97250 | 0.83356 |
| Glycerophosphocholine | 22.2% | 0.03762 | 0.05361 | 0.06223 |
| Lactic acid | 22.1% | 0.00065 | 0.27126 | 0.01432 |
| Myristoleic acid | 19.4% | 0.00006 | 0.00000 | 0.00011 |
| 2-Hydroxyvaleric acid | 19.1% | 0.00036 | 0.01785 | 0.04943 |
| 4-Acetamidobutanoic acid | 19.0% | 0.00012 | 0.00032 | 0.00328 |

FIG. 2 (Contd.)

Table 2

| | | | | | | |
|---|---|---|---|---|---|---|
| 0.00000 | 0.00036 | | 0.00000 | 0.00000 | 0.00077 | 0.00000 |
| 0.00028 | 0.00036 | 0.00108 | 0.00000 | 0.00005 | 0.00012 | 0.00192 |
| 0.00159 | 0.00000 | 0.00023 | 0.00166 | 0.00000 | 0.00242 | 0.00000 |
| 0.00198 | 0.00081 | 0.00231 | 0.00235 | 0.00115 | 0.00010 | 0.00142 |
| 0.09268 | 0.01872 | 0.00018 | 0.00200 | 0.02486 | 0.00922 | 0.00598 |
| n.d. | n.d. | 0.00205 | 0.07638 | n.d. | n.d. | n.d. |
| n.d. | n.d. | n.d. | n.d. | n.d. | n.d. | n.d. |
| n.d. | n.d. | n.d. | n.d. | n.d. | n.d. | n.d. |
| 0.00154 | 0.00388 | 0.00116 | 0.00172 | 0.00194 | 0.00068 | 0.00436 |
| 0.00150 | 0.00296 | 0.00003 | 0.00067 | 0.00273 | 0.00005 | 0.00141 |
| 0.00640 | 0.00738 | 0.00499 | 0.01219 | 0.00736 | 0.00282 | 0.00504 |
| n.d. | n.d. | n.d. | n.d. | n.d. | n.d. | n.d. |
| 0.08740 | 1.17334 | 0.00218 | 0.47660 | 0.00657 | 0.06352 | 0.56069 |
| 0.05433 | 0.06357 | 0.00012 | 0.12885 | 0.10396 | 0.00019 | 0.03574 |
| 0.38458 | 0.06209 | 0.00369 | 0.55269 | 0.34753 | 0.00587 | 0.00711 |
| 0.00000 | 0.00041 | 0.00115 | 0.00000 | 0.00014 | 0.00000 | 0.00110 |
| 0.01752 | 0.01423 | 0.01828 | 0.02462 | 0.00832 | 0.00117 | 0.00188 |
| 0.00024 | 0.00049 | 0.00053 | 0.00036 | 0.00058 | 0.00007 | 0.00040 |

FIG. 2 (Contd.)

| | | | |
|---|---|---|---|
| Glyceric acid | 18.7% | 0.00311 | 0.11115 | 0.01241 |
| N-Acetylaspartic acid | 18.1% | 0.00020 | 0.00057 | 0.00070 |
| Nicotinamide | 18.1% | 0.00091 | 0.00018 | 0.00223 |
| Glycerol | 17.1% | 0.17245 | 0.19986 | 0.22248 |
| Cytidine | 16.7% | n.d. | n.d. | n.d. |
| 3-(4-Hydroxyphenyl)propionic acid | 16.6% | 0.00000 | 0.00000 | 0.00000 |
| Phenylpyruvic acid | 13.2% | 0.00000 | 0.00000 | 0.00000 |
| Ala | 12.9% | 0.01476 | 0.03863 | 0.16193 |
| Gluconic acid | 12.9% | 0.05362 | 0.02356 | 0.03190 |
| N-Acetylglutamine | 12.4% | 0.00036 | 0.00072 | 0.00000 |
| Lauric acid C12:0 | 12.3% | 0.00038 | 0.00007 | 0.00051 |
| Dyphylline | 11.6% | 0.00192 | 0.00259 | 0.01835 |
| Alloisoleucine | 11.2% | n.d. | n.d. | n.d. |
| Succinic acid | 10.8% | 0.00475 | 0.10098 | 0.09417 |
| Choline | 9.8% | 0.09861 | 0.07624 | 0.09484 |
| 2-Hydroxy-4-methylvaleric acid | 9.1% | 0.00059 | 0.11604 | 0.06462 |
| N-Glycolylneuraminic acid | 8.7% | n.d. | n.d. | n.d. |
| Gluconolactone | 8.6% | 0.02037 | 0.00935 | 0.01260 |
| N-Acetylglutamic acid | 8.5% | 0.00154 | 0.00147 | 0.00173 |
| S-Methylcysteine | 8.5% | n.d. | n.d. | n.d. |

FIG. 2 (Contd.)

Table 2

| | | | | | | |
|---|---|---|---|---|---|---|
| 0.00485 | 0.00130 | 0.00428 | 0.01179 | 0.00000 | 0.00424 | 0.00105 |
| 0.00241 | 0.00042 | 0.00044 | 0.00324 | 0.00194 | 0.00022 | 0.00018 |
| 0.00098 | 0.00083 | 0.00024 | 0.00048 | 0.00195 | 0.00000 | 0.00000 |
| 0.17549 | 0.27560 | 0.15032 | 0.19434 | 0.16239 | 0.15141 | 0.12286 |
| n.d. | n.d. | n.d. | n.d. | n.d. | n.d. | n.d. |
| 0.00012 | 0.00000 | 0.00000 | 0.00000 | 0.00000 | 0.00000 | 0.00000 |
| 0.00000 | 0.00011 | 0.00017 | 0.00000 | 0.00000 | 0.00022 | 0.00127 |
| 0.01454 | 0.05595 | 0.02647 | 0.05686 | 0.03244 | 0.02584 | 0.04121 |
| 0.01003 | 0.00297 | 0.00245 | 0.03862 | 0.00620 | 0.00311 | 0.01535 |
| 0.00070 | 0.00000 | 0.00032 | 0.00085 | 0.00085 | 0.00040 | 0.00044 |
| 0.00000 | 0.00081 | 0.00285 | 0.00013 | 0.00000 | 0.00100 | 0.00163 |
| 0.00302 | 0.00321 | 0.00118 | 0.00184 | 0.00082 | 0.00030 | 0.01576 |
| n.d. | n.d. | n.d. | n.d. | n.d. | n.d. | n.d. |
| 0.12519 | 0.08140 | 0.56477 | 0.10148 | 0.12845 | 0.06616 | 0.04253 |
| 0.05763 | 0.02967 | 0.11256 | 0.11915 | 0.13550 | 0.11917 | 0.05481 |
| 0.09578 | 0.20729 | 0.14980 | 0.03648 | 0.15798 | 0.00090 | 0.00533 |
| n.d. | n.d. | n.d. | n.d. | n.d. | n.d. | n.d. |
| 0.00109 | 0.00008 | 0.00023 | 0.01552 | 0.00043 | 0.00047 | 0.00725 |
| 0.00141 | 0.00145 | 0.00313 | 0.00147 | 0.00226 | 0.00108 | 0.00019 |
| n.d. | n.d. | n.d. | n.d. | n.d. | n.d. | n.d. |

FIG. 2 (Contd.)

| | | | |
|---|---|---|---|
| Hydroxyproline | 6.9% | 0.00142 | 0.03537 | 0.01216 |
| Creatinine | 6.1% | 0.02486 | 0.09091 | 0.09625 |
| Citric acid | 6.0% | 0.00448 | 0.00000 | 0.03400 |
| Uracil | 6.0% | 0.00160 | 0.00189 | 0.00000 |
| Aminoacetone | 5.7% | 0.00658 | 0.00575 | 0.00498 |
| Cystathionine | 5.6% | n.d. | n.d. | n.d. |
| 4-Pyridoxic acid (pyradoxamine) | 5.6% | 0.00013 | 0.00000 | 0.00000 |
| Betaine | 5.4% | 0.09776 | 0.29191 | 0.35030 |
| XC0016 C5H8N2O2 Dihydrothymine | 4.3% | 0.00150 | 0.00630 | 0.00742 |
| N-Acetylmethionine | 3.7% | 0.00061 | 0.00110 | 0.00203 |
| O-Acetylcarnitine | 3.6% | 0.00000 | 0.00000 | 0.00000 |
| S-Sulfocysteine | 3.2% | 0.00000 | 0.00000 | 0.00000 |
| His | 2.7% | 0.07913 | 0.29797 | 0.50747 |
| Isethionic acid | 2.6% | n.d. | n.d. | n.d. |
| Anserine | 2.0% | 0.00006 | 0.00507 | 0.00550 |
| 2-Hydroxybutyric acid | 2.0% | 0.00000 | 0.00404 | 0.03218 |
| Putrescine | 1.8% | 0.00080 | 0.00212 | 0.00244 |
| Urea | 1.7% | 0.00187 | 0.00121 | 0.16953 |
| Gly | 0.1% | 0.177269 | 0.382897 | 0.707926 |

FIG. 2 (Contd.)

Table 2

| 0.02303 | 0.05680 | 0.00000 | 0.00342 | 0.00000 | n.d. | 0.00000 | 0.18707 | 0.00416 | 0.01075 | 0.00000 | 0.00000 | 0.00517 | n.d. | 0.00213 | 0.00130 | 0.02478 | 0.00000 | 0.417483 |
|---|---|---|---|---|---|---|---|---|---|---|---|---|---|---|---|---|---|---|
| 0.00058 | 0.00062 | 0.08795 | 0.01291 | 0.00572 | n.d. | 0.00000 | 0.09449 | 0.00529 | 0.00069 | 0.00000 | 0.00000 | 0.28591 | n.d. | 0.00000 | 0.00063 | 0.00031 | 0.28650 | 0.19891 |
| 0.00365 | 0.04804 | 1.26531 | 0.00015 | 0.01381 | n.d. | 0.00029 | 0.34138 | 0.00628 | 0.00179 | 0.00065 | 0.00000 | 0.16935 | n.d. | 0.00018 | 0.00460 | 0.00074 | 0.01748 | 0.51445 |
| 0.04697 | 0.11626 | 0.06526 | 0.00000 | 0.00758 | n.d. | 0.00000 | 0.36979 | 0.00792 | 0.00253 | 0.00000 | 0.00000 | 0.51291 | n.d. | 0.00573 | 0.00417 | 0.00254 | 0.00161 | 0.66574 |
| 0.00088 | 0.00067 | 0.04368 | 0.02308 | 0.01052 | n.d. | 0.00000 | 0.06577 | 0.00494 | 0.00080 | 0.00000 | 0.00015 | 0.07547 | n.d. | 0.00000 | 0.00373 | 0.00023 | 0.00213 | 0.259038 |
| 0.04539 | 0.10322 | 0.05369 | 0.00200 | 0.00062 | n.d. | 0.00000 | 0.36339 | 0.00779 | 0.00232 | 0.00000 | 0.00000 | 0.39782 | n.d. | 0.00579 | 0.00177 | 0.00267 | 0.00191 | 0.480206 |
| 0.00026 | 0.22776 | 0.67987 | 0.00000 | 0.01843 | n.d. | 0.00110 | 0.18069 | 0.00449 | 0.00081 | 0.00035 | 0.00011 | 0.04798 | n.d. | 0.01385 | 0.00582 | 0.00085 | 0.00456 | 0.23225 |

FIG. 2 (Contd.)

Table 3

| Metabolite name | LPS effect on control | CT10 effect on LPS |
|---|---|---|
| Isobutyric acid Butyric acid | 1424.2% | -93.4% |
| 1-Methyladenosine | 1032.2% | -91.2% |
| GABA | 870.8% | -69.6% |
| Ethyl glucuronide | 373.2% | -96.4% |
| 8-Hydroxyoctanoic acid 2-Hydroxyoctanoic acid | 294.3% | -74.6% |
| SDMA | 243.4% | -44.0% |
| Homoserine | 160.0% | -48.8% |
| Decanoic acid | 136.2% | -58.7% |
| Azelaic acid | 133.1% | -80.0% |
| Hypotaurine | 105.1% | -47.8% |
| Glyoxylic acid | 104.6% | 11.9% |
| S-Sulfocysteine | 72.7% | -36.4% |
| Kynurenine | 67.3% | -22.8% |
| 2-Aminoisbutyric acid 2-Aminobutyric acid | 51.5% | -29.0% |
| Arg | 49.7% | -17.0% |

FIG. 3

|  |  |  |
|---|---|---|
| Asn | 43.8% | -17.6% |
| Cystine | 41.1% | -20.8% |
| Betaine | 39.6% | -14.3% |
| Pyruvic acid | 38.5% | -37.1% |
| 2'-Deoxycytidine | 32.0% | -11.7% |
| Pro | 30.6% | -7.6% |
| Ser | 25.3% | -11.6% |
| Aminoacetone | 24.1% | -8.5% |
| Phosphocreatine | 20.0% | -21.6% |
| Ethanolamine | 19.9% | -13.3% |
| Guanidoacetic acid | 17.6% | -12.3% |
| Myristoleic acid | 17.4% | -64.0% |
| Octanoic acid | 15.3% | -12.8% |
| N-Acetylgalactosamine N-Acetylmannosamine N-Acetylglucosamine | 15.1% | -35.1% |
| β-Ala | 14.5% | -11.0% |
| Cysteine glutathione disulfide | 14.1% | -7.6% |
| Choline | 11.1% | -6.5% |
| His | 10.9% | -9.5% |
| 2-Hydroxyvaleric acid | 7.4% | -6.5% |
| Leu | 2.3% | 4.3% |
| Ile | 2.0% | 4.6% |
| γ-Butyrobetaine | 0.3% | 2.1% |

FIG. 3 (Contd.)

Table 4

| Metabolite name | %Change in LPS-injected compared to mock-injected male animals Treated with PBS Control | %Change in LPS-injected compared to mock-injected male animals Treated with CT10 |
|---|---|---|
| XC0120 | 1641.6% | -26.3% |
| S-Methylglutathione | 1093.9% | -91.6% |
| Homoserine | 634.9% | -49.6% |
| S-Methylmethionine | 630.0% | 18.6% |
| Xanthosine | 581.1% | -64.2% |
| Quinic acid | 455.4% | -47.1% |
| Pyruvic acid | 419.7% | -20.3% |
| 7,8-Dihydrobiopterin | 390.4% | 12.1% |
| 6-Aminohexanoic acid | 357.0% | -78.1% |
| Cysteine glutathione disulfide | 330.9% | -52.2% |
| N1-Methyl-4-pyridone-5-carboxamidine | 262.0% | 11.3% |
| 3-Ureidopropionic acid | 238.3% | -97.9% |
| N8-Acetylspermidine | 211.0% | 61.4% |
| N-Acetylalanine | 178.1% | -10.4% |
| 3-Hydroxy-3-methylglutaric acid | 176.0% | 35.6% |
| Decanoic acid | 168.9% | -87.5% |
| Cystine | 165.6% | -11.9% |
| N-Acetylhistidine | 129.8% | -5.2% |
| XA0017 | 124.6% | -75.1% |
| 1-Methylnicotin amine | 116.0% | -12.9% |
| trans-Cinnamic acid | 105.8% | -75.0% |
| N-Acetylgalactosamine N-Acetylmannosamine N-Acetylglucosamine | 94.7% | -8.0% |

FIG. 4

| | | |
|---|---|---|
| Phenaceturic acid | 91.3% | 119.0% |
| SDMA | 88.1% | 34.6% |
| Uracil | 88.0% | -24.7% |
| Glutathione (GSSG)_divalent | 84.3% | -34.6% |
| N-Glycolyneuraminic acid | 82.3% | -13.2% |
| 2-Hydroxyisbutyric acid | 81.4% | 14.8% |
| Alloisoleucine | 71.7% | -43.5% |
| Uric acid | 57.1% | -21.4% |
| Glucaric acid | 55.4% | 1.0% |
| Thiamine | 50.6% | 1.5% |
| Homocarnosine | 46.3% | -3.8% |
| Arg | 46.1% | -10.0% |
| p-Hydroxyphenylpyruvic acid | 44.1% | -1.0% |
| 4-Acetamidobutanoic acid | 43.7% | -38.7% |
| Butyrylcarnitine | 37.9% | -16.7% |
| Cystathionine | 36.6% | 14.0% |
| N,N-Dimethyglycine | 36.4% | 28.3% |
| 3-Hydroxybutyric acid | 35.9% | -22.8% |
| N-Acetylglucosamine 1-phosphate | 34.9% | -100.0% |
| Cytidine | 31.9% | -1.0% |
| N-Acetylglutamic acid | 29.3% | -26.5% |
| Choline | 26.8% | -15.0% |
| 1-Methylhistidine | 26.4% | 19.4% |
| Urocanic acid | 25.8% | 35.6% |
| S-Methylcysteine | 24.3% | 20.3% |
| Isethionic acid | 23.9% | -23.6% |
| XC0016 C5H8N2O2 Dihydrothymine | 23.1% | -17.0% |
| 2'Deoxycytidine | 22.9% | 6.2% |

FIG. 4 (Contd.)

| | | |
|---|---|---|
| Succinic acid | 22.2% | -38.3% |
| Lactic acid | 20.4% | -1.9% |
| Nicotinamide | 19.1% | -30.1% |
| Aminoacetone | 17.7% | 5.5% |
| N-Acetylglycine | 17.6% | 2.7% |
| Glycerophosphocholine | 16.0% | -2.4% |
| Betaine | 15.9% | 24.6% |
| Ethanolamine phosphate | 15.8% | -33.2% |
| Putrescine | 15.4% | 15.4% |
| Pipecolic acid | 15.1% | 1.7% |
| N-Acetylglutamine | 14.4% | 1.9% |
| S-Sulfocysteine | 14.3% | -14.4% |
| Lys | 14.2% | 11.9% |
| 2-Oxoisovaleric acid | 13.7% | -43.8% |
| 3-Indoxylsulfuric acid | 13.6% | 18.4% |
| Anserine | 13.5% | -10.0% |
| Isovalerylalanine N-Acetylleucine | 12.9% | -24.2% |
| Trimethylamine N-oxide | 11.7% | -17.0% |
| Glucuronic acid Galacturonic acid | 10.9% | -18.4% |
| Myristoleic acid | 10.9% | -21.8% |
| N-Acetylaspartic acid | 10.6% | -9.5% |
| Gluconic acid | 10.5% | -11.8% |
| Gluconolactone | 10.5% | -17.5% |
| Glycerol 3-phosphate | 9.7% | -38.5% |
| 4-Guanidinobutyric acid | 9.4% | -82.4% |
| Glycerol | 8.9% | -15.7% |

FIG. 4 (Contd.)

| | | |
|---|---|---|
| Theobromine | 8.8% | -29.9% |
| Dyphylline | 8.7% | -14.5% |
| Hydroxyproline | 8.5% | 13.1% |
| XC0001 | 8.2% | -8.4% |
| 2,6-Diaminopimelic acid | 8.0% | -72.3% |
| Phosphocreatine | 7.9% | -32.3% |
| Leu | 7.8% | -8.3% |
| Uridine | 6.5% | -24.1% |
| 3-4(4-Hydroxyphenyl)propionic acid | 6.5% | -9.9% |
| Ala | 6.4% | 21.8% |
| O-Acetylcarnitine | 5.6% | -2.1% |
| 2-Hydroxyvaleric acid | 5.3% | 8.1% |
| Lauric acid C12:0 | 4.0% | -5.2% |
| Carnitine | 3.9% | 0.0% |
| Pantothenic acid | 3.6% | 7.2% |
| Creatine | 3.6% | 5.2% |
| Glyceric acid | 2.6% | -5.6% |
| Ribulose 5-phosphate | 2.3% | 20.7% |
| Stachydrine | 1.8% | -21.5% |
| 2-Hydroxybutyric acid | 0.7% | -32.9% |
| Homocystenesulfinic acid | 0.3% | -7.5% |

FIG. 4 (Contd.)

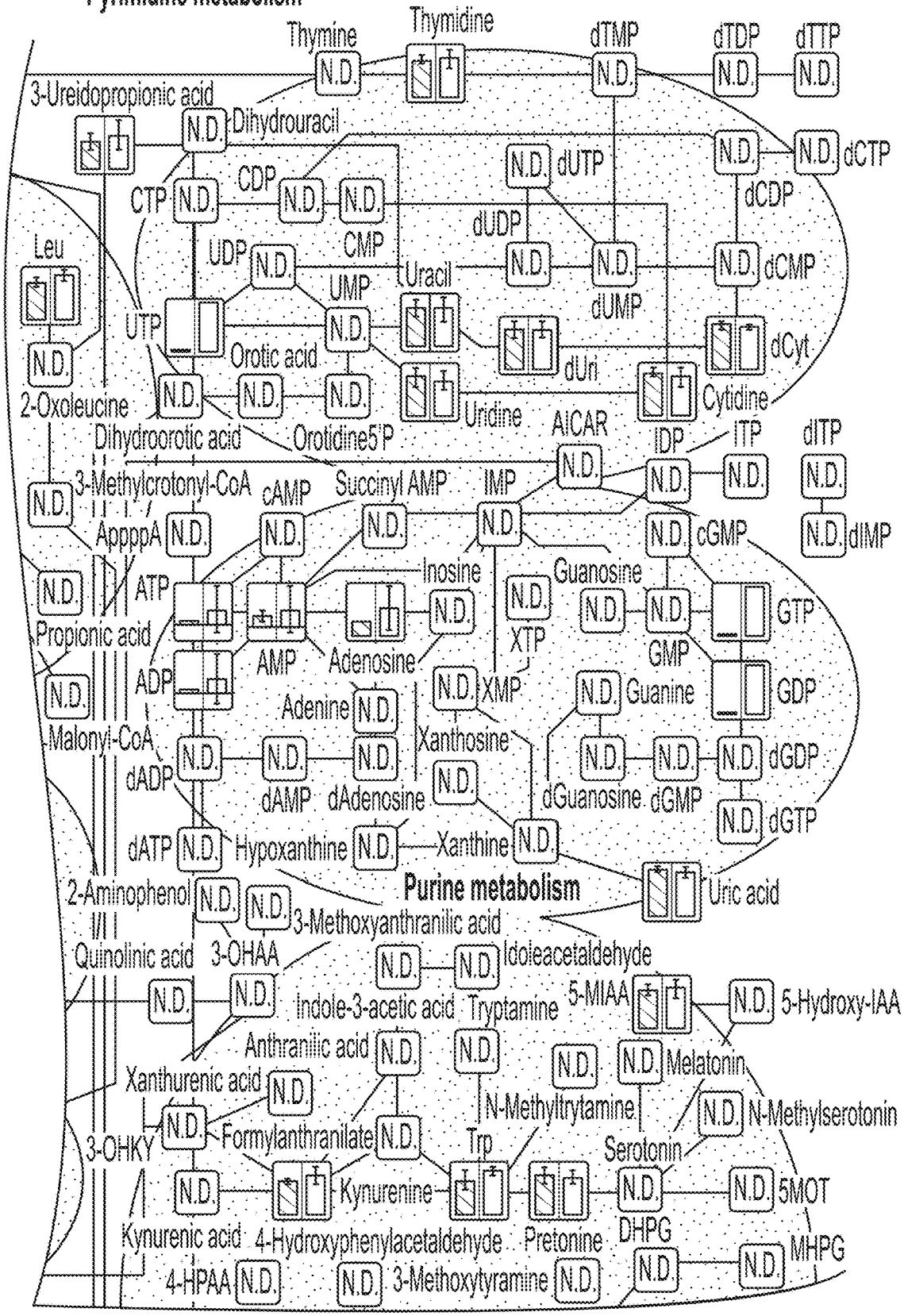
FIG. 7 (Contd.)

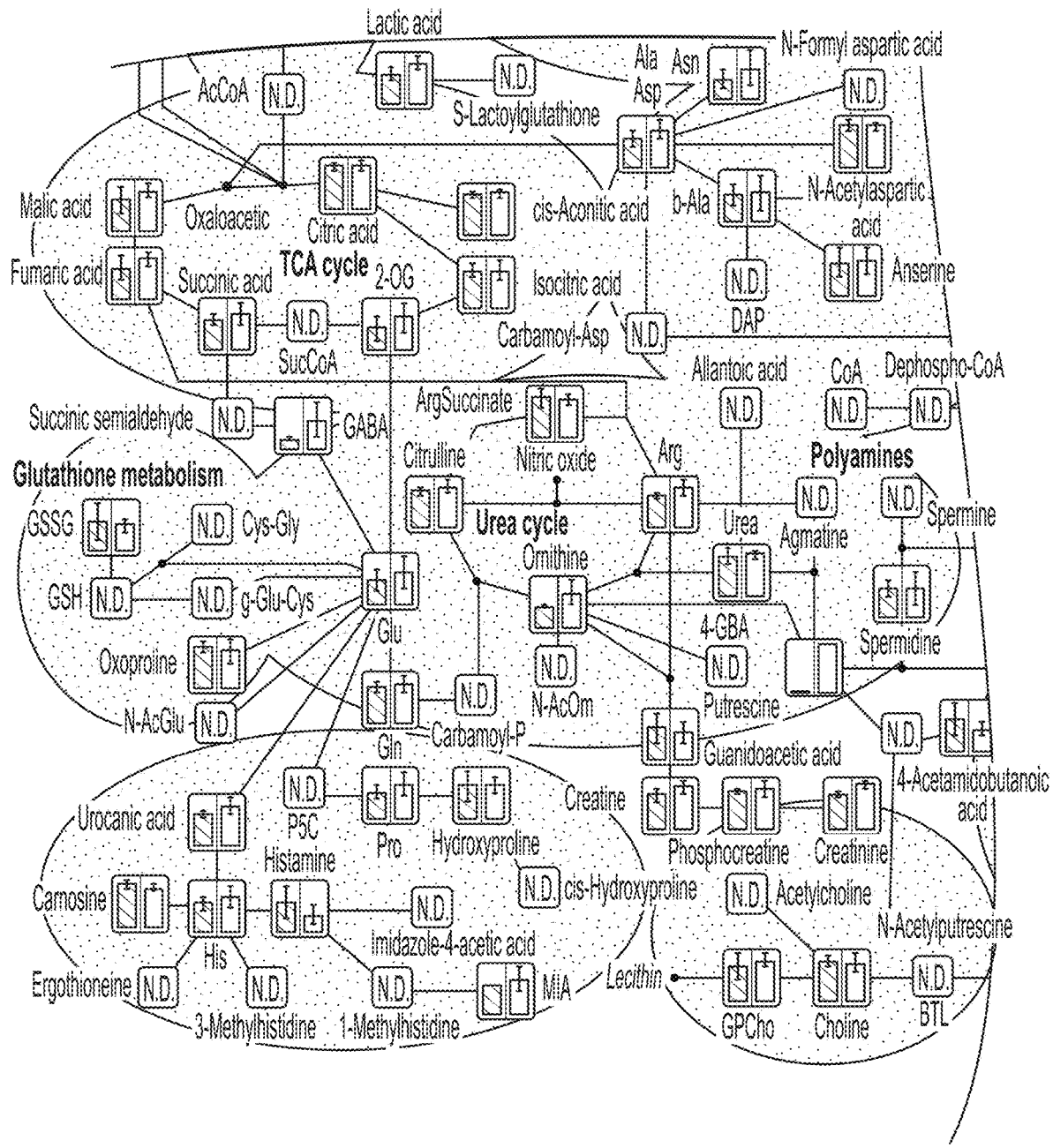
FIG. 7 (Contd.)

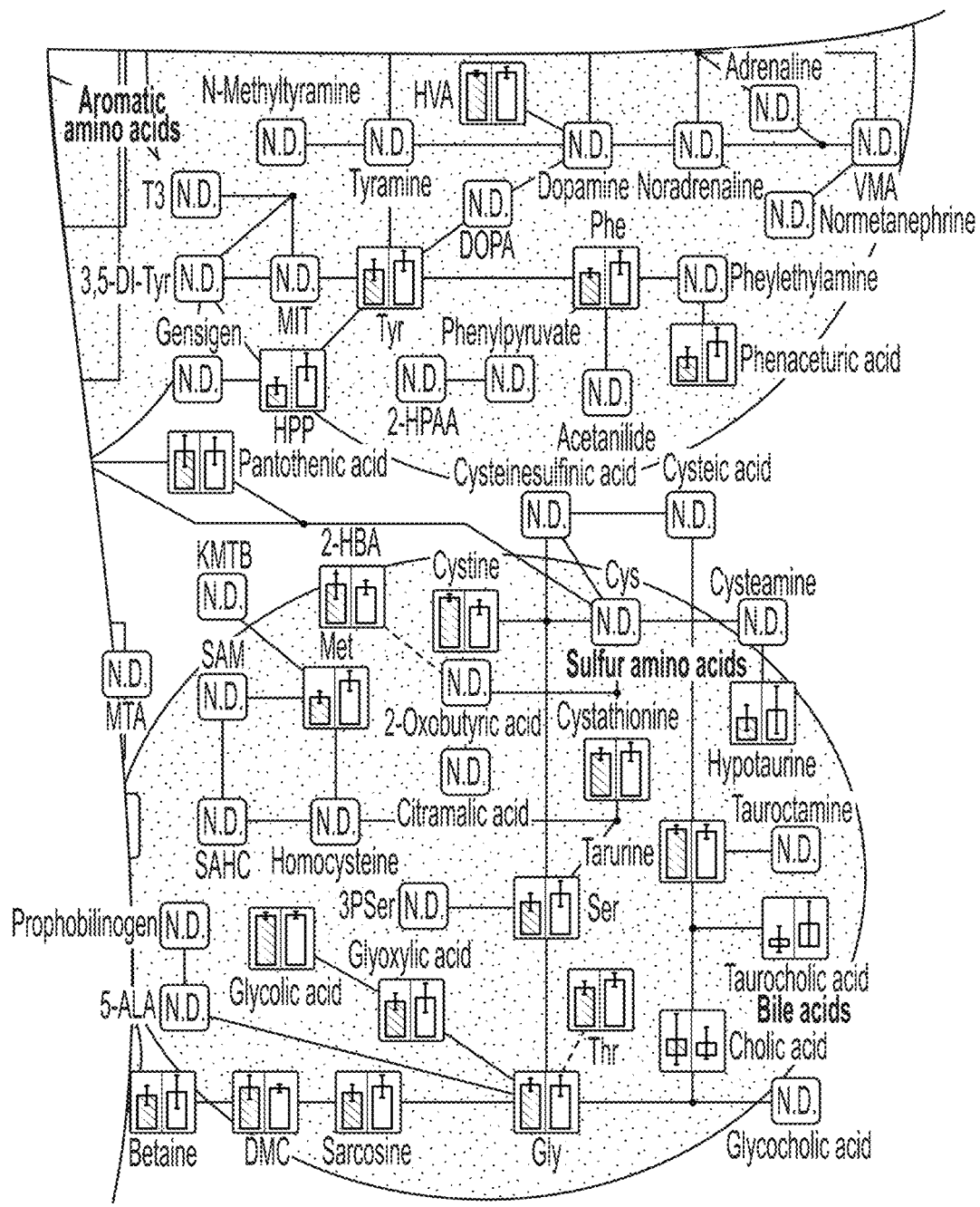
FIG. 7 (Contd.)

METHODS AND USES OF MICROBIOME COMPOSITIONS

CROSS REFERENCE TO RELATED APPLICATIONS

The present application claims priority to U.S. Provisional Patent Application No. 63/077,544, filed Sep. 11, 2020, the entire contents of which is hereby incorporated by reference in its entirety.

BACKGROUND

Generally, a metabolome is understood to be the metabolites present within an organism, cell, or tissue. The levels of one or more metabolites present within an organism, cell, or tissue, may be associated with certain diseases, disorders, or conditions.

SUMMARY

The present disclosure provides an insight that compositions as described herein may be used to modulate the metabolome of a subject (e.g. a mammal (e.g. human, mice, etc.)). Among other things, the present disclosure describes technologies that can be used to evaluate the effects of administering compositions (e.g. microbiome compositions) to a subject and to identify or characterize effects and/or modulation of levels of metabolites or a metabolome of a subject upon administration of such compositions. In some embodiments, the metabolites that may be modulated may be associated with certain diseases, disorders, or conditions. In some embodiments, such technologies can be useful to discern metabolite-level differences in a particular subject (e.g., patient) or population (e.g. before and after administration of disclosed compositions). Accordingly, the present disclosure also provides technologies that can be useful to identify and/or assess the nature and effect of disclosed compositions in specific subjects (e.g., patients) and/or populations and thus provide subject-specific information on how individual subject's metabolomes (e.g. one or more metabolite levels) differentially affect their health conditions. For example, in some embodiments, technologies provided herein can be useful to identify diseases, disorders, or conditions to which a subject might be susceptible, based on the metabolome in subject-specific samples, and treat and/or prevent such diseases, disorders, or conditions by administering disclosed compositions (e.g. to modulate subject's metabolome). Thus, technologies described herein may be useful as diagnostic tools for screening for certain diseases, disorders, or conditions, and for treating and/or preventing such diseases, disorders, or conditions.

Among other things, the present disclosure provides a method comprising determining a level of one or more metabolites in a sample from a subject. In some embodiments, a subject has received a composition comprising one or more microbial strains. In some embodiments, a subject has received a composition comprising one or more lipopolysaccharides. In some embodiments, a subject has received a composition comprising one or more microbial strains and a composition comprising one or more lipopolysaccharides. In some embodiments, a subject has received a composition comprising one or more microbial strains and one or more lipopolysaccharides.

In some embodiments, a subject is a mammal. In some embodiments, a subject is a human. In some embodiments, a subject is suffering from or at risk of suffering from a disease, disorder, or condition.

In some embodiments, one or more microbial strains are from a mammalian microbiome. In some embodiments, one or more microbial strains are from a human microbiome. In some embodiments, one or more microbial strains are from the subject's microbiome.

In some embodiments, one or more microbial strains are selected from TABLE 5.

In some embodiments, one or more microbial strains are *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis, Acidaminococcus* sp., or a combination thereof. In some embodiments, a composition comprises or consists of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp.

In some embodiments, a composition comprises two or more microbial strains. In some embodiments, a composition comprises five or more microbial strains. In some embodiments, a composition comprises ten or more microbial strains.

In some embodiments, one or more lipopolysaccharides is from *Escherichia coli, Salmonella* sp., *Shigella* sp., *Pseudomonas* sp., *Moraxella* sp., *Helicobacter* sp., *Stenotrophomonas* sp., *Bdellovibrio* sp., *Legionella* sp., acetic acid bacteria, cyanobacteria, spirochaetes, green sulfur, green non-sulfur bacteria, or a combination thereof. In some embodiments, one or more lipopolysaccharides is from *E. coli*. In some embodiments, one or more lipopolysaccharides is from *E. coli* 0111.B4.

In some embodiments, one or more metabolites comprise one or more metabolites from TABLE 1, TABLE 2, TABLE 3, TABLE 4, or a combination thereof. In some embodiments, one or more metabolites is selected from TABLE 1, TABLE 2, TABLE 3, TABLE 4, or a combination thereof. In some embodiments, at least one of one or more metabolites are associated with a disease, disorder, or condition.

In some embodiments, a sample is or comprises a cell or tissue. In some embodiments, a sample is or comprises a bodily fluid. In some embodiments, a sample is or comprises amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humour, vomit, interstitial fluid, lymphatic fluid, plasma, mucous, digestive fluid, stool, and/or combinations or component(s) thereof.

In some embodiments, determining a level of one or more metabolites in a sample from a subject comprises quantifying a level of one or more metabolites in a the sample from the subject. In some embodiments, a level is the presence or absence of one or more metabolites. In some embodiments, a level is a concentration of one or more metabolites.

In some embodiments, a method comprises administering to the subject a composition comprising one or more microbial strains. In some embodiments, a method further comprises administering to the subject a composition comprising one or more lipopolysaccharides. In some embodiments, a method further comprises administering to the subject a composition comprising one or more microbial strains and one or more lipopolysaccharides.

In some embodiments, a method comprises administering to the subject a composition comprising one or more microbial strains and a composition comprising one or more lipopolysaccharides. In some embodiments, a composition comprising one or more microbial strains and a composition comprising one or more lipopolysaccharides are administered concurrently. In some embodiments, a composition comprising one or more microbial strains and a composition comprising one or more lipopolysaccharides are administered sequentially. In some embodiments, a composition comprising one or more microbial strains and a composition comprising one or more lipopolysaccharides are administered via different administration routes.

In some embodiments, a method comprises comparing a level of one or more metabolites in a sample from the subject to a reference value. In some embodiments, a reference value is a control reference value. In some embodiments, a control reference value is a historical value, such as a value previously determined or in the literature. In some embodiments, a reference value is a level of one or more metabolites in a control sample from a subject, where the control sample was obtained from the subject prior to the subject receiving the one or more microbial strains, one or more lipopolysaccharides, or both.

In some embodiments, a method comprises determining a percent difference between a determined level of one or more metabolites in a sample as compared to a control reference value.

In some embodiments, a method comprises determining whether one or more microbial strains modulates a level of one or more metabolites in a subject. In some embodiments, a method comprises administering at least a subset of one or more microbial strains to a subject, if it has been determined that the administered one or more microbial strains modulates a level of one or more metabolites in the subject. In some embodiments, one or more metabolites are associated with a disease, disorder, or condition that the subject is suffering from or is at risk of developing.

In some embodiments, a method is a method of modulating one or more metabolites in a subject.

In some embodiments, a method is a method of characterizing the ability of one more microbial strains to modulate one or more metabolites in a subject.

In some embodiments, a method is a method of characterizing the metabolome of a subject.

In some embodiments, a method is a method of treating or ameliorating a disease, disorder, or condition in a subject, wherein the disease, disorder, or condition is associated with one or more metabolites.

The present disclosure provides, inter alia, a composition comprising one or more microbial strains. In some embodiments, one or more microbial strains are one or more of the microbial strains listed in TABLE 5. In some embodiments, one or more microbial strains are two or more of the microbial strains listed in TABLE 5. In some embodiments, one or more microbial strains are five or more of the microbial strains listed in TABLE 5. In some embodiments, one or more microbial strains are ten or more of the microbial strains listed in TABLE 5.

The present disclosure provides a composition comprising *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis, Acidaminococcus* sp., or a combination thereof. In some embodiments, a composition comprises at least two microbial strains selected from the group consisting of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp. In some embodiments, a composition comprises at least five microbial strains selected from the group consisting of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp. In some embodiments, a composition comprises or consists of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp.

In some embodiments, a composition is a pharmaceutical composition. In some embodiments, a composition comprises a pharmaceutically acceptable carrier.

In some embodiments, a composition is an ingestible item.

The present disclosure provides that a composition as described herein is for use in modulating one or more metabolites in a subject.

The present disclosure provides that a composition as described herein is for use in characterizing the ability of one more microbial strains to modulate one or more metabolites in a subject.

The present disclosure provides that a composition as described herein is for use in characterizing the metabolome of a subject.

The present disclosure provides that a composition as described herein is for use in treating or ameliorating a disease, disorder, or condition in a subject, wherein the disease, disorder, or condition is associated with one or more metabolites.

The present disclosure provides a use of a composition as described herein for modulating one or more metabolites in a subject.

The present disclosure provides a use of a composition as described herein for characterizing the ability of one more microbial strains to modulate one or more metabolites in a subject.

The present disclosure provides a use of a composition a composition as described herein for characterizing the metabolome of a subject.

The present disclosure provides a use of a composition as described herein for treating or ameliorating a disease, disorder, or condition in a subject, wherein the disease, disorder, or condition is associated with one or more metabolites.

These, and other aspects encompassed by the present disclosure, are described in more detail below and in the claims.

DEFINITIONS

The scope of the present invention is defined by the claims appended hereto and is not limited by certain embodiments described herein. Those skilled in the art, reading the present specification, will be aware of various modifications that may be equivalent to such described embodiments, or otherwise within the scope of the claims. In general, terms used herein are in accordance with their understood meaning in the art, unless clearly indicated otherwise. Explicit definitions of certain terms are provided below; meanings of these and other terms in particular instances throughout this specification will be clear to those skilled in the art from context.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The articles "a" and "an," as used herein, should be understood to include the plural referents unless clearly indicated to the contrary. Claims or descriptions that include "or" between one or more members of a group are considered satisfied if one, more than one, or all of the group members are present in, employed in, or otherwise relevant to a given product or process unless indicated to the contrary or otherwise evident from the context. In some embodiments, exactly one member of a group is present in, employed in, or otherwise relevant to a given product or process. In some embodiments, more than one, or all group members are present in, employed in, or otherwise relevant to a given product or process. It is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Where elements are presented as lists (e.g., in Markush group or similar format), it is to be understood that each subgroup of the elements is also disclosed, and any element(s) can be removed from the group. It should be understood that, in general, where embodiments or aspects are referred to as "comprising" particular elements, features, etc., certain embodiments or aspects "consist," or "consist essentially of," such elements, features, etc. For purposes of simplicity, those embodiments have not in every case been specifically set forth in so many words herein. It should also be understood that any embodiment or aspect can be explicitly excluded from the claims, regardless of whether the specific exclusion is recited in the specification.

Administration: As used herein, the term "administration" typically refers to the administration of a composition to a subject or system to achieve delivery of an agent to the subject or system. In some embodiments, the agent is, or is included in, the composition; in some embodiments, the agent is generated through metabolism of the composition or one or more components thereof. Those of ordinary skill in the art will be aware of a variety of routes that may, in appropriate circumstances, be utilized for administration to a subject, for example a human. For example, in some embodiments, administration may be ocular, oral, parenteral, topical, etc. In some particular embodiments, administration may be bronchial (e.g., by bronchial instillation), buccal, dermal (which may be or comprise, for example, one or more of topical to the dermis, intradermal, interdermal, transdermal, etc.), enteral, intra-arterial, intradermal, intragastric, intramedullary, intramuscular, intranasal, intraperitoneal, intrathecal, intravenous, intraventricular, within a specific organ (e. g. intrahepatic), mucosal, nasal, oral, rectal, subcutaneous, sublingual, topical, tracheal (e.g., by intratracheal instillation), vaginal, vitreal, etc. In many embodiments provided by the present disclosure, administration is oral administration. In some embodiments, administration may involve only a single dose. In some embodiments, administration may involve application of a fixed number of doses. In some embodiments, administration may involve dosing that is intermittent (e.g., a plurality of doses separated in time) and/or periodic (e.g., individual doses separated by a common period of time) dosing. In some embodiments, administration may involve continuous dosing (e.g., perfusion) for at least a selected period of time. Administration of cells can be by any appropriate route that results in delivery to a desired location in a subject where at least a portion of the delivered cells or components of the cells remain viable. A period of viability of cells after administration to a subject can be as short as a few hours, e.g., twenty-four hours, to a few days, to as long as several years, i.e., long-term engraftment. In some embodiments, administration comprises delivery of a bacterial extract or preparation comprising one or more bacterial metabolites and/or byproducts but lacking fully viable bacterial cells.

Analog: As used herein, the term "analog" refers to a substance that shares one or more particular structural features, elements, components, or moieties with a reference substance. Typically, an "analog" shows significant structural similarity with the reference substance, for example sharing a core or consensus structure, but also differs in certain discrete ways. In some embodiments, an analog is a substance that can be generated from the reference substance, e.g., by chemical manipulation of the reference substance. In some embodiments, an analog is a substance that can be generated through performance of a synthetic process substantially similar to (e.g., sharing a plurality of steps with) one that generates the reference substance. In some embodiments, an analog is or can be generated through performance of a synthetic process different from that used to generate the reference substance.

Approximately: As applied to one or more values of interest, includes to a value that is similar to a stated reference value. In certain embodiments, the term "approximately" or "about" refers to a range of values that fall within ±10% (greater than or less than) of the stated reference value unless otherwise stated or otherwise evident from the context (except where such number would exceed 100% of a possible value).

Comparable: As used herein, the term "comparable" refers to two or more agents, entities, situations, sets of conditions, subjects, etc., that may not be identical to one another but that are sufficiently similar to permit comparison therebetween so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Conservative: As used herein, refers to instances when describing a conservative amino acid substitution, including a substitution of an amino acid residue by another amino acid residue having a side chain R group with similar chemical properties (e.g., charge or hydrophobicity). In general, a conservative amino acid substitution will not substantially change the functional properties of interest of a protein, for example, the ability of a receptor to bind to a ligand. Examples of groups of amino acids that have side chains with similar chemical properties include: aliphatic side chains such as glycine (Gly, G), alanine (Ala, A), valine (Val, V), leucine (Leu, L), and isoleucine (Ile, I); aliphatic-hydroxyl side chains such as serine (Ser, S) and threonine (Thr, T); amide-containing side chains such as asparagine (Asn, N) and glutamine (Gln, Q); aromatic side chains such as phenylalanine (Phe, F), tyrosine (Tyr, Y), and tryptophan (Trp, W); basic side chains such as lysine (Lys, K), arginine (Arg, R), and histidine (His, H); acidic side chains such as aspartic acid (Asp, D) and glutamic acid (Glu, E); and sulfur-containing side chains such as cysteine (Cys, C) and methionine (Met, M). Conservative amino acids substitution groups include, for example, valine/leucine/isoleucine (Val/Leu/Ile, V/L/I), phenylalanine/tyrosine (Phe/Tyr, F/Y), lysine/arginine (Lys/Arg, K/R), alanine/valine (Ala/Val, A/V), glutamate/aspartate (Glu/Asp, E/D), and asparagine/glutamine (Asn/Gln, N/Q). In some embodiments, a conservative amino acid substitution can be a substitution of any native residue in a protein with alanine, as used in, for example, alanine scanning mutagenesis. In some embodiments, a conservative substitution is made that has a positive value in the PAM250 log-likelihood matrix disclosed in Gonnet, G. H. et al., 1992, Science 256:1443-1445, which is incorporated herein by reference in its entirety. In some embodiments, a substitution is a moderately conservative substitution wherein the substitution has a nonnegative value in the PAM250 log-likelihood matrix.

CONSERVATIVE AMINO ACID SUBSTITUTIONS

| For Amino Acid | Code | Replace With |
| --- | --- | --- |
| Alanine | A | D-ala, Gly, Aib, β-Ala, Acp, L-Cys, D-Cys |
| Arginine | R | D-Arg, Lys, D-Lys, homo-Arg, D-homo-Arg, Met, Ile, D-Met, D-Ile, Orn, D-Orn |
| Asparagine | N | D-Asn, Asp, D-Asp, Glu, D-Glu, Gln, D-Gln |
| Aspartic Acid | D | D-Asp, D-Asn, Asn, Glu, D-Glu, Gln, D-Gln |
| Cysteine | C | D-Cys, S-Me-Cys, Met, D-Met, Thr, D-Thr |
| Glutamine | Q | D-Gln, Asn, D-Asn, Glu, D-Glu, Asp, D-Asp |
| Glutamic Acid | E | D-Glu, D-Asp, Asp, Asn, D-Asn, Gln, D-Gln |
| Glycine | G | Ala, D-Ala, Pro, D-Pro, Aib, β-Ala, Acp |
| Isoleucine | I | D-Ile, Val, D-Val, AdaA, AdaG, Leu, D-Leu, Met, D-Met |
| Leucine | L | D-Leu, Val, D-Val, AdaA, AdaG, Leu, D-Leu, Met, D-Met |
| Lysine | K | D-Lys, Arg, D-Arg, homo-Arg, D-homo-Arg, Met, D-Met, Ile, D-Ile, Orn, D-Orn |
| Methionine | M | D-Met, S-Me-Cys, Ile, D-Ile, Leu, D-Leu, Val, D-Val |
| Phenyl-alanine | F | D-Phe, Tyr, D-Thr, L-Dopa, His, D-His, Trp, D-Trp, Trans-3,4 or 5-phenylproline, AdaA, AdaG, cis-3,4 or 5-phenylproline, Bpa, D-Bpa |
| Proline | P | D-Pro, L-I-thioazolidine-4-carboxylic acid, D-or-L-1-oxazolidine-4-carboxylic acid (Kauer, U.S. Pat. No. (4,511,390) |
| Serine | S | D-Ser, Thr, D-Thr, allo-Thr, Met, D-Met, Met (O), D-Met (O), L-Cys, D-Cys |
| Threonine | T | D-Thr, Ser, D-Ser, allo-Thr, Met, D-Met, Met (O), D-Met (O), Val, D-Val |
| Tyrosine | Y | D-Tyr, Phe, D-Phe, L-Dopa, His, D-His |
| Valine | V | D-Val, Leu, D-Leu, Ile, D-Ile, Met, D-Met, AdaA, AdaG |

Control: As used herein, refers to the art-understood meaning of a "control" being a standard against which results are compared. Typically, controls are used to augment integrity in experiments by isolating variables in order to make a conclusion about such variables. In some embodiments, a control is a reaction or assay that is performed simultaneously with a test reaction or assay to provide a comparator. A "control" also includes a "control animal." A "control animal" may have a modification as described herein, a modification that is different as described herein, or no modification (i.e., a wild-type animal). In one experiment, a "test" (i.e., a variable being tested) is applied. In a second experiment, the "control," the variable being tested is not applied. In some embodiments, a control is a historical control (i.e., of a test or assay performed previously, or an amount or result that is previously known). In some embodiments, a control is or comprises a printed or otherwise saved record. A control may be a positive control or a negative control.

Determining, measuring, evaluating, assessing, assaying and analyzing: Determining, measuring, evaluating, assessing, assaying and analyzing are used interchangeably herein to refer to any form of measurement, and include determining if an element is present or not. These terms include both quantitative and/or qualitative determinations. Assaying may be relative or absolute. "Assaying for the presence of" can be determining the amount of something present and/or determining whether or not it is present or absent.

Dosage form: Those skilled in the art will appreciate that the term "dosage form" may be used to refer to a physically discrete unit of an agent (e.g., a therapeutic agent) for administration to a subject. Typically, each such unit contains a predetermined quantity of agent. In some embodiments, such quantity is a unit dosage amount (or a whole fraction thereof) appropriate for administration in accordance with a dosing regimen that has been determined to correlate with a desired or beneficial outcome when administered to a relevant population (i.e., with a therapeutic dosing regimen). Those of ordinary skill in the art appreciate that the total amount of a therapeutic composition or agent administered to a particular subject is determined by one or more attending physicians and may involve administration of multiple dosage forms.

Dosing regimen: Those skilled in the art will appreciate that the term "dosing regimen" may be used to refer to a set of unit doses (typically more than one) that are administered individually to a subject, typically separated by periods of time. In some embodiments, a given agent has a recommended dosing regimen, which may involve one or more doses. In some embodiments, a dosing regimen comprises a plurality of doses each of which is separated in time from other doses. In some embodiments, individual doses are separated from one another by a time period of the same length; in some embodiments, a dosing regimen comprises a plurality of doses and at least two different time periods separating individual doses. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen comprises a first dose in a first dose amount, followed by one or more additional doses in a second dose amount same as the first dose amount. In some embodiments, a dosing regimen is correlated with a desired or beneficial outcome when administered across a relevant population.

Engineered: In general, the term "engineered" refers to the aspect of having been manipulated by the hand of man. For example, a cell or organism is considered to be "engineered" if it has been manipulated so that its genetic information is altered (e.g., new genetic material not previously present has been introduced, for example by transformation, mating, somatic hybridization, transfection, transduction, or other mechanism, or previously present genetic material is altered or removed, for example by substitution or deletion mutation, or by mating protocols). As is common practice and is understood by those in the art, progeny of an engineered polynucleotide or cell are typically still referred to as "engineered" even though the actual manipulation was performed on a prior entity.

Excipient: As used herein, refers to an inactive (e.g., non-therapeutic) agent that may be included in a pharmaceutical composition, for example to provide or contribute to a desired consistency or stabilizing effect. In some embodiments, suitable pharmaceutical excipients may include, for example, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like.

Functional: As used herein, a "functional" biological molecule is a biological molecule in a form in which it exhibits a property and/or activity by which it is characterized. A biological molecule may have two functions (i.e., bifunctional) or many functions (i.e., multifunctional).

Gene: As used herein, refers to a DNA sequence in a chromosome that codes for a product (e.g., an RNA product and/or a polypeptide product). In some embodiments, a gene includes coding sequence (i.e., sequence that encodes a particular product). In some embodiments, a gene includes non-coding sequence. In some particular embodiments, a gene may include both coding (e.g., exonic) and non-coding (e.g., intronic) sequence. In some embodiments, a gene may include one or more regulatory sequences (e.g., promoters, enhancers, etc.) and/or intron sequences that, for example, may control or impact one or more aspects of gene expression (e.g., cell-type-specific expression, inducible expression, etc.). For the purpose of clarity, we note that, as used in the present disclosure, the term "gene" generally refers to a portion of a nucleic acid that encodes a polypeptide or fragment thereof; the term may optionally encompass regulatory sequences, as will be clear from context to those of ordinary skill in the art. This definition is not intended to exclude application of the term "gene" to non-protein-coding expression units but rather to clarify that, in most cases, the term as used in this document refers to a polypeptide-coding nucleic acid.

Improve, increase, enhance, inhibit or reduce: As used herein, the terms "improve," "increase," "enhance," "inhibit," "reduce," or grammatical equivalents thereof, indicate values that are relative to a baseline or other reference measurement. In some embodiments, a value is statistically significantly difference that a baseline or other reference measurement. In some embodiments, an appropriate reference measurement may be or comprise a measurement in a particular system (e.g., in a single individual) under otherwise comparable conditions absent presence of (e.g., prior to and/or after) a particular agent or treatment, or in presence of an appropriate comparable reference agent. In some embodiments, an appropriate reference measurement may be or comprise a measurement in comparable system known or expected to respond in a particular way, in presence of the relevant agent or treatment. In some embodiments, an appropriate reference is a negative reference; in some embodiments, an appropriate reference is a positive reference.

Isolated: As used herein, refers to a substance and/or entity that has been (1) separated from at least some of the components with which it was associated when initially produced (whether in nature and/or in an experimental setting), and/or (2) designed, produced, prepared, and/or manufactured by the hand of man. In some embodiments, an isolated substance or entity may be enriched; in some embodiments, an isolated substance or entity may be pure. In some embodiments, isolated substances and/or entities may be separated from about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or more than about 99% of the other components with which they were initially associated. In some embodiments, isolated agents are about 80%, about 85%, about 90%, about 91%, about 92%, about 93%, about 94%, about 95%, about 96%, about 97%, about 98%, about 99%, or more than about 99% pure. As used herein, a substance is "pure" if it is substantially free of other components. In some embodiments, as will be understood by those skilled in the art, a substance may still be considered "enriched", "isolated" or even "pure", after having been combined with certain other components such as, for example, one or more carriers or excipients (e.g., buffer, solvent, water, etc.); in such embodiments, percent isolation or purity of the substance is calculated without including such carriers or excipients. Those skilled in the art are aware of a variety of technologies for isolating (e.g., enriching or purifying) substances or agents (e.g., using one or more of fractionation, extraction, precipitation, or other separation).

Level: As used herein, the term "level" refers to a scale of amount or quantity of a substance (e.g., a metabolite). In some embodiments, a level can be simply the presence or absence of an substance. A level of a substance may be represented in multiple ways or formats. For example, in some embodiments, a level may be represented as a percentage (%), a measure of weight (e.g., mg, µg, ng, etc.), a measure of concentration (e.g., mg/mL, µg/mL, ng/mL, etc.), a measure of volume (e.g., mL, µL, nL, etc.), in % change, etc.

Metabolite: As used herein, the term "metabolite" refers to a substance (e.g., a small molecule, macromolecule, organic compound, or inorganic compound) made or used during metabolism. Metabolism is generally understood as a process by which a substance (e.g., food, drug, chemical, cell, or tissue) is chemically broken down. In some embodiments, a metabolite is an end product. In some embodiments, a metabolite is an intermediate. Exemplary metabolites are provided herein, e.g., in Appendix 1-1, and FIGS. 1-4 and 7-14. Exemplary metabolic pathways are provided herein, e.g., in Appendix 1-2, and FIGS. 7-14.

Pharmaceutical composition: As used herein, the term "pharmaceutical composition" refers to a composition in which an active agent is formulated together with one or more pharmaceutically acceptable carriers. In some embodiments, the active agent is present in unit dose amount appropriate for administration in a therapeutic regimen that shows a statistically significant probability of achieving a predetermined therapeutic effect when administered to a relevant population. In some embodiments, a pharmaceutical composition may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue, capsules, powders, etc. In some embodiments, an active agent may be or comprise a cell or population of cells (e.g., a culture, for example of an EES microbe); in some embodiments, an active agent may be or comprise an extract or component of a cell or population (e.g., culture) of cells. In some embodiments, an active agent may be or comprise an isolated, purified, or pure compound. In some embodiments, an active agent may have been synthesized in vitro (e.g., via chemical and/or enzymatic synthesis). In some embodiments, an active agent may be or comprise a natural product (whether isolated from its natural source or synthesized in vitro).

Pharmaceutically acceptable: As used herein, the term "pharmaceutically acceptable" which, for example, may be used in reference to a carrier, diluent, or excipient used to formulate a pharmaceutical composition as disclosed herein, means that the carrier, diluent, or excipient is compatible with the other ingredients of the composition and not deleterious to the recipient thereof.

Pharmaceutically acceptable carrier: As used herein, the term "pharmaceutically acceptable carrier" means a pharmaceutically-acceptable material, composition or vehicle, such as a liquid or solid filler, diluent, excipient, or solvent encapsulating material, involved in carrying or transporting the subject compound from one organ, or portion of the body, to another organ, or portion of the body. Each carrier must be is "acceptable" in the sense of being compatible with the other ingredients of the formulation and not injurious to the subject (e.g., patient). Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

Prevention: The term "prevention", as used herein, refers to a delay of onset, and/or reduction in frequency and/or severity of one or more symptoms of a particular disease, disorder or condition. In some embodiments, prevention is assessed on a population basis such that an agent is considered to "prevent" a particular disease, disorder or condition if a statistically significant decrease in the development, frequency, and/or intensity of one or more symptoms of the disease, disorder or condition is observed in a population susceptible to the disease, disorder, or condition. In some embodiments, prevention may be considered complete, for example, when onset of a disease, disorder or condition has been delayed for a predefined period of time.

Reference: As used herein describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control. In some embodiments, a reference is a negative control reference; in some embodiments, a reference is a positive control reference.

Risk: As will be understood from context, "risk" of a disease, disorder, and/or condition refers to a likelihood that a particular individual will develop the disease, disorder, and/or condition. In some embodiments, risk is expressed as a percentage. In some embodiments, risk is from 0, 1, 2, 3, 4, 5, 6, 7, 8, 9, 10, 20, 30, 40, 50, 60, 70, 80, 90, or up to 100%. In some embodiments risk is expressed as a risk relative to a risk associated with a reference sample or group of reference samples. In some embodiments, a reference sample or group of reference samples have a known risk of a disease, disorder, condition and/or event. In some embodiments a reference sample or group of reference samples are from individuals comparable to a particular individual. In some embodiments, relative risk is 0, 1, 2, 3, 4, 5, 6, 7, 8, 9, 10, or more.

Sample: As used herein, the term "sample" typically refers to an aliquot of material obtained or derived from a source of interest. In some embodiments, a source of interest is a biological or environmental source. In some embodiments, a source of interest may be or comprise a cell or an organism, such as a microbe, a plant, or an animal (e.g., a human). In some embodiments, a source of interest is or comprises biological tissue or fluid. In some embodiments, a biological tissue or fluid may be or comprise amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humour, vomit, plasma, mucous, digestive fluid, stool, and/or combinations or component(s) thereof. In some embodiments, a biological fluid may be or comprise an intracellular fluid, an extracellular fluid, an intravascular fluid (blood plasma), an interstitial fluid, a lymphatic fluid, and/or a transcellular fluid. In some embodiments, a biological fluid may be or comprise a plant exudate. In some embodiments, a biological tissue or sample may be obtained, for example, by aspirate, biopsy (e.g., fine needle or tissue biopsy), swab (e.g., oral, nasal, skin, or vaginal swab), scraping, surgery, washing or lavage (e.g., bronchioalveolar, ductal, nasal, ocular, oral, uterine, vaginal, or other washing or lavage). In some embodiments, a biological sample is or comprises cells obtained from an individual. In some embodiments, a sample is a "primary sample" obtained directly from a source of interest by any appropriate means. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to one or more techniques such as amplification or reverse transcription of nucleic acid, isolation and/or purification of certain components, etc.

Small molecule: As used herein, the term "small molecule" refers to small organic or inorganic molecules of molecular weight below about 3,000 Daltons. In general, small molecules may have a molecular weight of less than 3,000 Daltons (Da). Small molecules can be, e.g., from at least about 100 Da to about 3,000 Da (e.g., between about 100 to about 3,000 Da, about 100 to about 2500 Da, about 100 to about 2,000 Da, about 100 to about 1,750 Da, about 100 to about 1,500 Da, about 100 to about 1,250 Da, about 100 to about 1,000 Da, about 100 to about 750 Da, about 100 to about 500 Da, about 200 to about 1500, about 500 to about 1000, about 300 to about 1000 Da, or about 100 to about 250 Da).

Subject: As used herein, the term "subject" refers to an individual to which a provided treatment is administered. In some embodiments, a subject is animal. In some embodiments, a subject is a mammal, e.g., a mammal that experiences or is susceptible to a disease, disorder, or condition as described herein. In some embodiments, an animal is a vertebrate, e.g., a mammal, such as a non-human primate, (particularly a higher primate), a sheep, a dog, a rodent (e.g. a mouse or rat), a guinea pig, a goat, a pig, a cat, a rabbit, or a cow. In some embodiments, an animal is a non-mammal animal, such as a chicken, an amphibian, a reptile, or an invertebrate model C. elegans. In some embodiments, a subject is a human. In some embodiments, a subject is suffering from or susceptible to one or more diseases, disorders or conditions as described herein. In some embodiments, a subject displays one or more symptoms of a one or more diseases, disorders or conditions as described herein. In some embodiments, a subject has been diagnosed with one or more diseases, disorders or conditions as described herein. In some embodiments, the subject is receiving or has received certain therapy to diagnose and/or to treat a disease, disorder, or condition. In another embodiment, the subject is an experimental animal or animal substitute as a disease model.

Substantially: As used herein, refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Therapeutic regimen: A "therapeutic regimen", as that term is used herein, refers to a dosing regimen whose administration across a relevant population may be correlated with a desired or beneficial therapeutic outcome.

Therapeutically effective amount: As used herein, is meant an amount that produces the desired effect for which it is administered. In some embodiments, the term refers to an amount that is sufficient, when administered to a population suffering from or susceptible to a disease, disorder, and/or condition in accordance with a therapeutic dosing regimen, to treat the disease, disorder, and/or condition. In some embodiments, a therapeutically effective amount is one that reduces the incidence and/or severity of, and/or delays onset of, one or more symptoms of the disease, disorder, and/or condition. Those of ordinary skill in the art will appreciate that the term "therapeutically effective amount" does not in fact require successful treatment be achieved in a particular individual. Rather, a therapeutically effective amount may be that amount that provides a particular desired pharmacological response in a significant number of subjects when administered to subjects (e.g., patients) in need of such treatment. In some embodiments, reference to a therapeutically effective amount may be a reference to an amount as measured in one or more specific tissues (e.g., a tissue affected by the disease, disorder or condition) or fluids (e.g., blood, saliva, serum, sweat, tears, urine, etc.). Those of ordinary skill in the art will appreciate that, in some embodiments, a therapeutically effective amount of a particular agent or therapy may be formulated and/or administered in a single dose. In some embodiments, a therapeutically effective agent may be formulated and/or administered in a plurality of doses, for example, as part of a dosing regimen.

Treatment: As used herein, the term "treatment" (also "treat" or "treating") refers to any administration of a therapy that partially or completely alleviates, ameliorates, relives, inhibits, delays onset of, reduces severity of, and/or reduces incidence of one or more symptoms, features, and/or causes of a particular disease, disorder, and/or condition. In some embodiments, such treatment may be of a subject who does not exhibit signs of the relevant disease, disorder and/or condition and/or of a subject who exhibits only early signs of the disease, disorder, and/or condition. Alternatively, or additionally, such treatment may be of a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

BRIEF DESCRIPTION OF THE DRAWING

FIG. 1 (Table 1) tabulates data showing % change in metabolite levels in female mice treated with CT10 composition compared to mock treatment and the corresponding levels of the metabolites in each microbial species present in CT10 composition. Microbial species in which the metabolite levels were highest are bolded and shaded.

FIG. 2 (Table 2) tabulates data showing % change in metabolite levels in male mice treated with CT10 composition compared to mock treatment and the corresponding levels of the metabolites in each microbial species present in CT10 composition. Microbial species in which the metabolite levels were highest are bolded and shaded.

FIG. 3 (Table 3) tabulates data showing % change in metabolite levels that were measured in female mice injected with LPS composition compared to mock-injected treatment. Also, the % change in metabolite levels measured in female mice treated with CT10 composition and injected with LPS composition compared to mock-injected treatment are shown.

FIG. 4 (Table 4) tabulates data showing % change in metabolite levels that were measured in male mice injected with LPS composition compared to mock-injected treatment. Also, the % change in metabolite levels measured in male mice treated with CT10 composition and injected with LPS composition compared to mock-injected treatment are shown.

Figure 14:
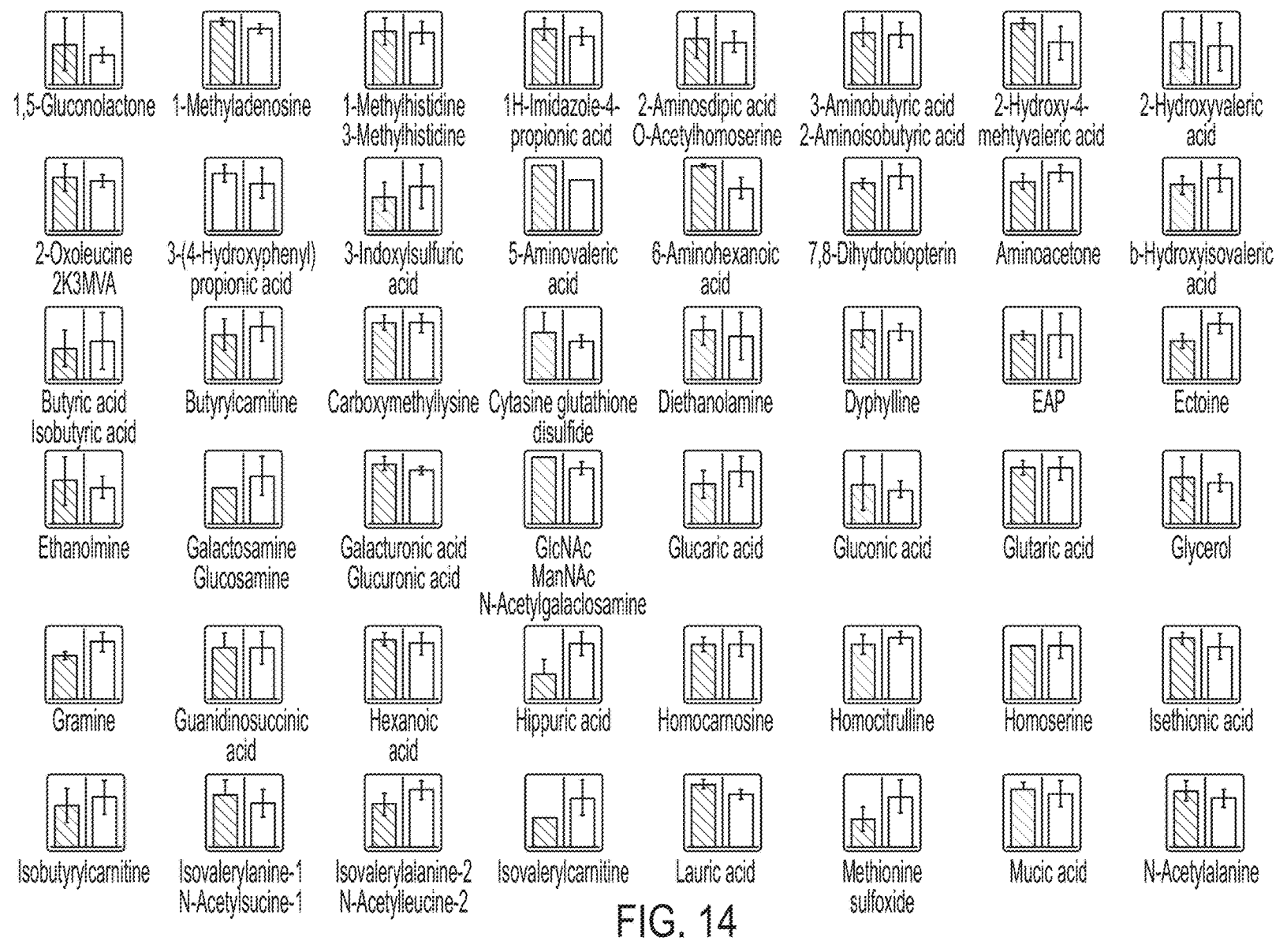
Figure 14:
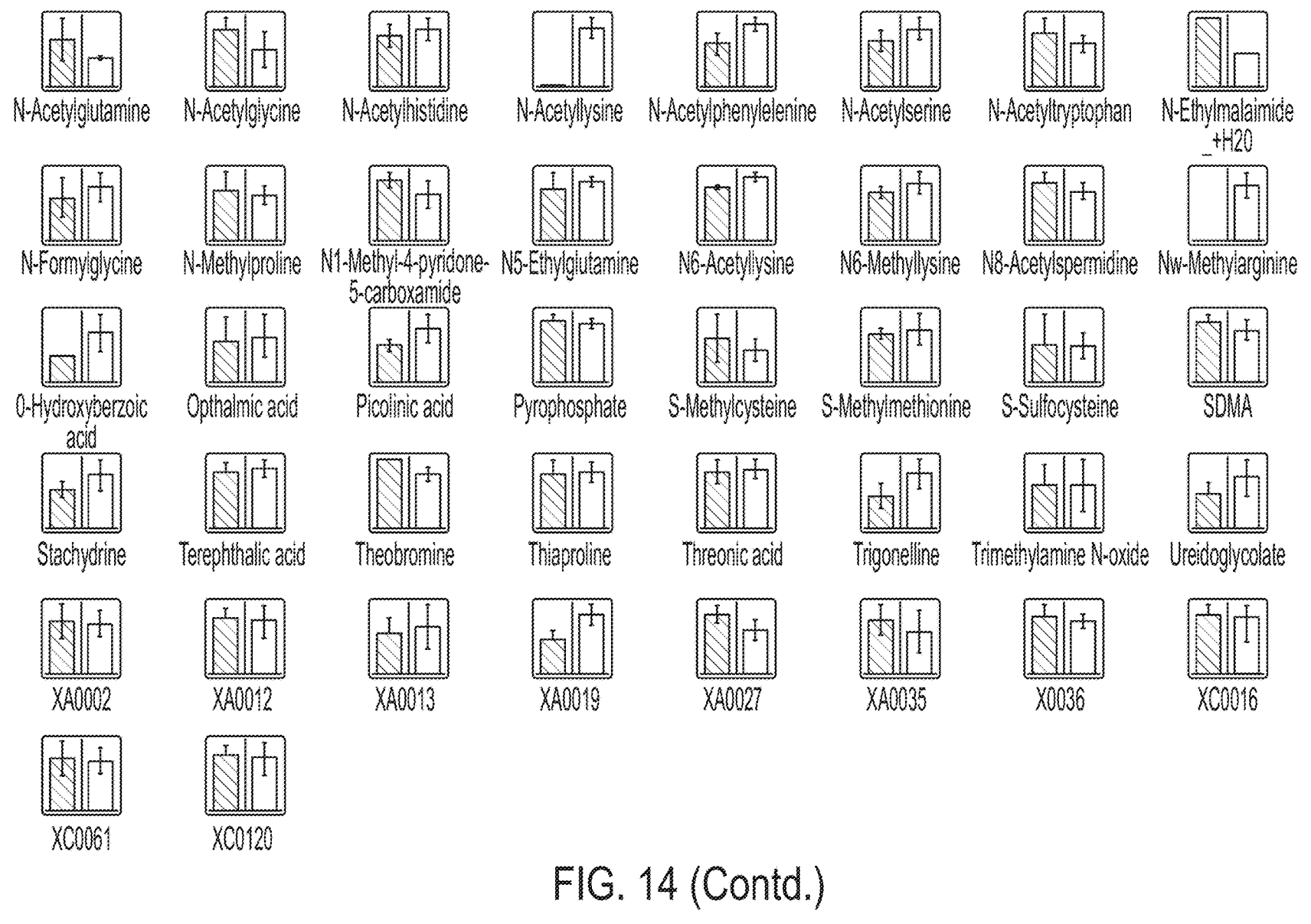

FIG. 14 shows levels of other metabolites that were detected in control and treatment groups. The bars/lines represent relative areas of each metabolite in control (blue), treatment (red), respectively.

DETAILED DESCRIPTION OF CERTAIN EMBODIMENTS

Microbial Preparation(s) and/or Component(s)

Figure 5:
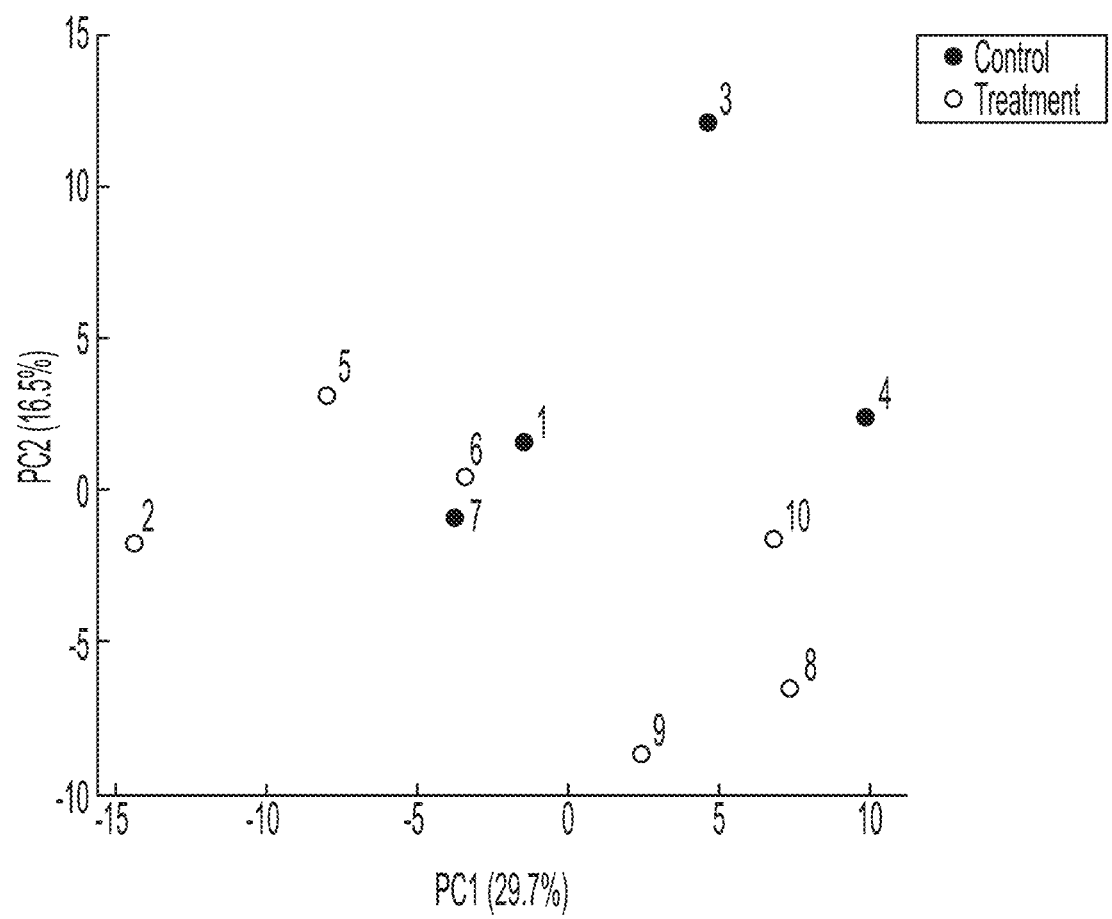
FIG. 5 includes data showing PCA results. PC1 and PC2 show first principal component and second principal component, respectively. The number in parentheses is the determined contribution rate. The plot labels are sample names. The "PCA Score" includes contribution ratios measured for each component. The "Factor Loading" includes factor loading that was used for each component.

The present disclosure provides systems and methods for assessing, characterizing, and identifying one or more microbial strains of a microbiome. Such systems and methods can be useful for assessing, characterizing, and identifying one or more microbial strains that affect the health of humans, livestock, and/or pets by modulating their respective metabolomes. In some embodiments, assessing, characterizing, and identifying one or more microbial strains from a microbiome of a snake, lizard, fish, or bird. In some embodiments, assessing, characterizing, and identifying one or more microbial strains from a mammalian microbiome. A mammalian microbiome can be a canine, a feline, an equine, a bovine, an ovine, a caprine, or a porcine microbiome. In some embodiments, a microbiome used in a system or method described herein may prevent or treat a disease or condition.

A microbiome can be isolated from any system or tissue of an organism that supports microbial growth. For example, a microbiome can be a cutaneous microbiome, an oral microbiome, a nasal microbiome, a gastrointestinal microbiome, a brain microbiome, a pulmonary microbiome, or a urogenital microbiome. A list of exemplary microbial strains found in a gastrointestinal microbiome is included below in Table 5. A person skilled in the art would understand that a microbiome sample can be obtained by various ways known in the art. For example, a cutaneous, oral, nasal, pulmonary, or urogenital microbiome sample could be obtained using a swab or tissue scrapping. In some embodiments, a gastrointestinal microbiome could be sampled from feces. A cutaneous microbiome, an oral microbiome, a nasal microbiome, a gastrointestinal microbiome, a brain microbiome, a pulmonary microbiome, or a urogenital microbiome sample could be obtained via a biopsy.

In some embodiments, a microbiome is a microbiome of a healthy individual or an individual who does not suffer from or is not at risk of developing a particular disease or disorder. In some embodiments, a microbiome is a microbiome of an individual that suffers from or is at risk of developing a particular disease or disorder. In some embodiments, a microbiome is a microbiome of an individual who is known to suffer from a particular disease or disorder. In some embodiments, a human microbiome is a microbiome of a human with an unknown risk for one or more diseases or conditions.

In some embodiments, a microbiome is a reference microbiome. A reference microbiome can be a microbiome of a healthy individual or an individual who does not suffer from or is not at risk of developing a particular disease or disorder. In some instances, a reference microbiome may be from the same individual as a microbiome to be assessed or characterized, but was obtained at a different time. In some instances, a reference microbiome may be from the same individual as a microbiome to be assessed or characterized, but was obtained from a different system or tissue.

In some embodiments, an individual microbial strain or a combination of microbial strains may be assessed, characterized, or identified in a different relative amount than such strain or strains are found in a microbiome. For example, the effect of modulation of levels of one or more metabolites of a cell or organism in response to a single strain may be assessed, characterized, or identified using in vitro methods (e.g. mammalian cells) or in vivo methods using mammals (e.g. mice, humans, etc.) as described herein, even though it is naturally present in a microbiome with other microbial strains. As another example, the effect of modulation of levels of one or more metabolites of a cell or organism in response to two microbial strains may be assessed, characterized, or identified together using methods described herein, even though they are naturally present in a microbiome with additional microbial strains.

An extract, component, or compound of a microbial strain may also be assessed, characterized, or identified using methods described herein. In some cases, an extract, component, or compound of a microbial strain that has been determined to affect a level of one or more metabolites of an organism (e.g. mammal) may be assessed, characterized, or identified. Assessing, characterizing or identifying an extract, component, or compound of a microbial strain that affects a level of one or more metabolites of an organism (e.g. mammal) may provide additional information about potential biomarkers, targets, or protective agents in a microbiome.

A variety of technologies are known in the art that can be used to prepare extracts of microbial strains, and/or to isolate extracts, components, or compounds therefrom, or to process (e.g., to isolate and/or purify one or more components or compounds from). To give but a few examples, such technologies may include, for example, one or more of organic extraction, vacuum concentration, chromatography, and so on.

Assessing Biological Impact

The present disclosure provides the insight that compositions (e.g. microbiome compositions) as described herein can be used to identify, characterize, or modulate one or more levels of metabolites (e.g. metabolome) of an organism (e.g. a mammal (e.g. a human)) by contacting the composition(s) (e.g., feeding the compositions to, administering to) with an organism. In some embodiments, an organism may suffer from or be at risk of suffering from a disease, disorder, or condition (e.g. mammalian disease, disorder, or condition). To determine whether one or more compositions affects levels of one or more metabolites (e.g. that may be indicative of a disease, disorder, or condition), the levels of the one or more metabolites can be observed, measured, or assessed in samples that have been contacted with the one or more compositions. For example, levels of the one or more metabolites can be observed, measured, or assessed in samples at different times (e.g. before administration of composition, after administration of composition, during administration of composition, etc.). Various metabolite levels of an organism can be observed, measured, or assessed to determine whether compositions as disclosed herein affects the metabolome of said organism. As just a few examples, metabolites whose levels may be observed, measured, or assessed to determine whether compositions as disclosed herein affects an organism, include those listed for example in Appendix 1-1, and FIGS. 1-4 and 7-14.

In some embodiments, methods described herein utilize a first sample and a second sample. In some embodiments, a first sample is a reference sample. In some embodiments, a reference sample can be a sample obtained from a subject who is contacted with (e.g., administered or fed) a composition, e.g., CT10 composition. In some embodiments, a reference sample can be a sample obtained from a subject who is contacted with (e.g., administered or fed) a composition, e.g., CT10 composition, at a first time point. In some embodiments, a reference sample can be a sample obtained from a subject prior to being contacted with (e.g., administered or fed) a composition, e.g., CT10 composition. In some embodiments, a reference sample can be a sample obtained from a healthy individual. In some embodiments, a reference sample can be a sample obtained from an individual who is suffering from or may have a risk for a disease, disorder, or condition. In some embodiments, a reference sample is a control sample. In some embodiments, a reference sample is a negative control sample. In some embodiments, a reference sample is a positive control sample. In some embodiments, a reference sample may be a historic reference (e.g. value across control samples). In some embodiments, a reference sample may be from a printed publication (e.g. a text book, a journal, etc.).

In some embodiments, a second sample can be a test sample. In some embodiments, a test sample may be a sample obtained from a subject who is contacted with (e.g., administered or fed) a composition, e.g., CT10 composition. In some instances, a subject (e.g. patient or population) may be suffering from or at risk of a disease, disorder, or condition. In some instances, a subject (e.g. patient or population) with an unknown risk for one or more diseases, disorders, or conditions. In some embodiments, a test can be a sample obtained from a subject who is contacted with (e.g., administered or fed) a composition, e.g., CT10 composition, at a second time point.

In some embodiments, methods described herein comprise comparing one or more metabolite levels (e.g. a metabolome) obtained from a test sample with one or more metabolite levels (e.g. a metabolome) obtained from a reference sample. In some embodiments, by comparing one or more metabolite levels obtained from a test sample with one or more metabolite levels obtained from a reference sample, a composition described herein can be assessed, characterized or identified as being useful for modulating metabolite levels. In some embodiments, by comparing one or more metabolite levels obtained from a test sample with one or more metabolite levels obtained from a reference sample, it can be determined that a composition as disclosed herein increases the severity or incidence of a disease, disorder, or condition phenotype. In some embodiments, by comparing one or more metabolite levels obtained from a test sample with one or more metabolite levels obtained from a reference sample, it can be determined that a composition as disclosed herein decreases the severity or incidence of a disease, disorder, or condition phenotype. In some embodiments, by comparing one or more metabolite levels obtained from a test sample with one or more metabolite levels obtained from a reference sample, it can be determined that a composition as disclosed herein has no effect on the severity or incidence of a disease, disorder, or condition phenotype.

Compositions and methods provided herein can be useful in assessing, characterizing, or identifying one or more metabolite levels that affect a mammalian disease, disorder, or condition. The present disclosure also provides the recognition that compositions and methods provided herein can be used to define and/or characterize a metabolome signature associated with a disease, disorder, or condition. Further, the present disclosure provides the recognition that compositions and methods provided herein can be used to define and/or characterize a metabolome signature associated with one or more features of a disease, disorder, or condition (e.g., severity, responsiveness to therapy, etc.). For example, if multiple metabolite levels are determined to be associated with an increased severity of a disease, disorder, or condition, e.g., across multiple individuals, the metabolite levels, as well as their relative amounts, could be used as a signature to identify individuals who are at risk of developing an increased severity of the disease, disorder, or condition. As another example, if multiple metabolite levels are determined to be associated with an increased severity of a disease, disorder, or condition, e.g., in a single individual, at certain times (e.g., after removal from a treatment), the metabolite levels, as well as their relative amounts, could be used as a signature to identify when that individual is at risk of developing an increased severity of the disease, disorder, or condition.

The present disclosure also provides the recognition that compositions and methods provided herein can be used to diagnose an individual with a disease, disorder, or condition. In fact, using a metabolome signature associated with a disease, disorder, or condition determined through the use compositions and methods provided herein, an individual can be diagnosed early and/or identified as an individual at risk.

The present disclosure also provides the recognition that compositions and methods provided herein can be used to monitor progression of a disease, disorder, or condition in an individual. For example, if metabolite levels determined to increase the severity of a disease, disorder, or condition decrease in relative amount, it may indicate that the disease, disorder, or condition is being attenuated, e.g., by treatment or immune response.

The present disclosure also provides the insight that compositions and methods provided herein can be used to tailor treatments (e.g., therapies, nutraceuticals, and/or probiotics) to an individual patient. In some embodiments, compositions and methods provided herein can provide "personalized" therapy. In some cases, metabolite levels within an individual can be assessed, characterized, or identified to determine if they have a disease, disorder, or condition. Based on the results, the individual can be treated with one or more compositions to adjust the metabolite levels (i.e., their metabolome). In some instances, this will affect the disease, disorder, or condition the individual is suffering from or at risk of developing. For example, if an individual is determined to have a relatively low amount of one or more metabolite levels that have been determined to decrease the severity of a disease, disorder, or condition, administration of the one or more compositions that have been determined to decrease the severity of a disease, disorder, or condition to the individual (or an extract, component, or compound thereof) may attenuate the severity of the individual's disease or condition.

The present disclosure provides the insight that compositions and methods provided herein can be used recursively treat, prevent, or ameliorate a disease, disorder, or condition. In some embodiments, for example, one or more compositions disclosed herein may be administered (e.g. fed, injected, etc.) to a subject after determining the effect of one or more compositions on subject's metabolite levels. In some embodiments, a composition may be administered once. In some embodiments, a composition may be administered more than once. In some embodiments, a composition may be administered daily, weekly, biweekly, monthly, bimonthly, etc. In each of these instances, levels of one or more metabolites may be monitored. In some embodiments, levels of one or more metabolites (e.g. metabolome) may be monitored before administration of a composition. In some embodiments, levels of one or more metabolites (e.g. metabolome) may be monitored after administration of a composition.

Pharmaceutical Compositions

Provided herein are compositions comprising individual microbial strains or combinations of microbial strains. In some embodiments, a composition comprises individual microbial strains or combinations of microbial strains from a mammalian microbiome, extracts thereof, and/or components thereof, which have been assessed, identified, characterized or assayed using methods as described herein. In some embodiments, a composition provided herein comprises two or more, three or more, four or more, five or more, six or more, seven or more, eight or more, nine or more, or ten or more microbial strains from a mammalian microbiome, extracts thereof, and/or components thereof, which have been assessed, identified, characterized or assayed using methods as described herein.

In some embodiments, a composition provided herein comprises two or more, three or more, four or more, five or more, six or more, seven or more, eight or more, nine or more, or ten or more microbial strains listed in Table 5 below.

TABLE 5

Exemplary Microbial Strains Found in Human Gut Microbiome

Bacteroides pectinophilus
Acetobacter sp
Acetobacterium tundrae
Achromobacter aegrifaciens
Achromobacter insuavis
Achromobacter piechaudii
Achromobacter xylosoxidans
Acidaminococcus fermentans
Acidaminococcus intestini
Acinetobacter baumannii
Acinetobacter junii
Actinomyces sp.
Agathobacter rectalis
Agathobaculum butyriciproducens
Aggregatibacter segnis
Akkermansia muciniphila
Alistipes finegoldii
Alistipes indistinctus
Alistipes onderdonkii
Alistipes putredinis
Alistipes shahii
Allisonella histaminiformans
Anaerobaculum hydrogeniformans
Anaerococcus hydrogenalis
Anaerococcus octavius
Anaerococcus prevotii
Anaerococcus tetradius
Anaerococcus vaginalis
Anaerofilum agile
Anaerofustis stercorihominis
Anaerosporobacter mobilis
Anaerostipes caccae
Anaerostipes hadrus
Anaerostipes rhamnosivorans
Anaerotruncus colihominis
Anaerovorax odorimutans
Arcobacter butzleri
Asaccharobacter celatus
Atopobium parvulum
Atopobium vaginae
Bacillus cereus
Bacillus coagulans
Bacillus licheniformis
Bacillus pseudomycoides
Bacillus sonorensis
Bacillus toyonensis
Bacillus wiedmannii
Bacteroides caccae
Bacteroides cellulosilyticus
Bacteroides clarus
Bacteroides coprocola
Bacteroides coprophilus
Bacteroides dorei
Bacteroides eggerthii
Bacteroides faecis
Bacteroides finegoldii
Bacteroides fluxus
Bacteroides fragilis
Bacteroides intestinalis
Bacteroides massiliensis
Bacteroides nordii
Bacteroides oleiciplenus
Bacteroides ovatus
Bacteroides plebeius
Bacteroides salanitronis
Bacteroides salyersiae
Bacteroides stercoris
Bacteroides thetaiotaomicron
Bacteroides uniformis
Bacteroides vulgatus
Bacteroides xylanisolvens
Bacteroides xylanolyticus TABLE 5-continued Exemplary Microbial Strains Found in Human Gut Microbiome

- Barnesiella intestinihominis
- Bartonella clarridgeiae
- Bartonella quintana str. Toulouse
- Bifidobacterium adolescentis
- Bifidobacterium angulatum
- Bifidobacterium animalis
- Bifidobacterium bifidum
- Bifidobacterium breve
- Bifidobacterium catenulatum
- Bifidobacterium coryneforme
- Bifidobacterium dent/urn
- Bifidobacterium faecale
- Bifidobacterium gall/cum
- Bifidobacterium longum
- Bifidobacterium longum subsp. infantis
- Bifidobacterium longum subsp. longum
- Bifidobacterium longum subsp. suis
- Bifidobacterium pseudocatenulatum
- Bifidobacterium pseudolongum
- Bifidobacterium stercoris
- Bilophila w adsw orthia
- Bittarella massiliensis
- Blautia coccoides
- Blautia faecis
- Blautia glucerasea
- Blautia hansenii
- Blautia hydrogenotrophica
- Blautia luti
- Blautia obeum
- Blautia producta
- Blautia schinkii
- Blautia stercoris
- Blautia wexlerae
- Bradyrhizobium japonicum
- Burkholderia ambifaria
- Burkholderia cenocepacia
- Burkholderia glumae
- Burkholderia multivorans
- Burkholderia plantarii
- Butyricicoccus faecihominis
- Butyricicoccus pullicaecorum
- Butyricimonas faecihominis
- Butyricimonas paravirosa
- Butyricimonas virosa
- Butyrivibrio crossotus
- Campylobacter coli
- Campylobacter concisus
- Campylobacter curvus
- Campylobacter gracilis
- Campylobacter hominis
- Campylobacter jejuni subsp. Jejuni
- Campylobacter showae
- Campylobacter upsaliensis
- Candidatus Dorea massiliensis
- Candidatus Stoquefichus massiliensis
- Capnocytophaga gingivalis
- Capnocytophaga sputigena
- Cardiobacterium hominis
- Catenibacterium mitsuokai
- Catonella morbi
- Cedecea lapagei
- Citrobacter amalonaticus
- Citrobacter freundii
- Citrobacter koseri
- Citrobacter youngae
- Clostridium acetobutryicum
- Clostridium aerotolerans
- Clostridium aldenense
- Clostridium aminophilum
- Clostridium aminovalericum
- Clostridium amygdalinum
- Clostridium asparagiforme
- Clostridium baratii
- Clostridium bartlettii
- Clostridium beijerinckii
- Clostridium bifermentans
- Clostridium bolteae
- Clostridium butyricum
- Clostridium celerecrescens
- Clostridium cf. saccharolyticum
- Clostridium citroniac
- Clostridium clariflavum
- Clostridium clostridigforme
- Clostridium cocleatum
- Clostridium colinum
- Clostridium difficile
- Clostridium glycyrrhizinilyticum
- Clostridium hathewayi
- Clostridium herbivorans
- Clostridium hiranonis
- Clostridium hylemonae
- Clostridium innocuum
- Clostridium lactatifermentans
- Clostridium lavalense
- Clostridium leptum
- Clostridium methoxybenzovorans
- Clostridium methylpentosum
- Clostridium nexile
- Clostridium orbiscindens
- Clostridium oroticum
- Clostridium perfringens
- Clostridium polysaccharolyticum
- Clostridium propionicum
- Clostridium ramosum
- Clostridium rectum
- Clostridium saccharogumia
- Clostridium saccharolyticum
- Clostridium sardiniense
- Clostridium saudii
- Clostridium scindens
- Clostridium sordellii
- Clostridium sphenoides
- Clostridium spiroforme
- Clostridium sporogenes
- Clostridium sticklandii
- Clostridium straminisolvens
- Clostridium symbiosum
- Clostridium tertium
- Clostridium thermocellum
- Clostridium xylanolyticum
- Clostridium xylanovorans
- Collinsella aerofaciens
- Collinsella intestinalis
- Collinsella stercoris
- Collinsella tanakaei
- Coprobacillus cateniformis
- Coprobacter fastidiosus
- Coprococcus catus
- Coprococcus comes
- Coprococcus eutactus
- Corynebacterium ammoniagenes
- Corynebacterium matruchotii
- Corynebacterium pseudogenitalium
- Corynebacterium tuberculostearicum
- Deinococcus radiodurans
- Dermabacter hominis
- Desulfotomaculum guttoideum
- Desulfovibrio legallis
- Desulfovibrio piger
- Dialister invisus
- Dialister microaerophilus
- Dialister succinatiphilus
- Dielma fastidiosa
- Dorea formicigenerans
- Dorea longicatena
- Dysgonomonas mossii
- Edwardsiella tarda
- Eggerthella lenta
- Eggerthella sinensis
- Eikenella corrodens
- Eisenbergiella tayi
- Enhydrobacter aerosaccus
- Enterobacter aerogenes
- Enterobacter asburiae TABLE 5-continued Exemplary Microbial Strains Found in Human Gut Microbiome

- Enterobacter cancerogenus
- Enterobacter cloacae
- Enterobacter hormaechei
- Enterobacter kobei
- Enterobacter ludwigii
- Enterobacter xiangfangensis
- Enterococcus asini
- Enterococcus avium
- Enterococcus casseliflavus
- Enterococcus durans
- Enterococcus faecalis
- Enterococcus faecium
- Enterococcus gallinarum
- Enterococcus hirae
- Enterococcus mundtii
- Enterococcus raffinosus
- Enterococcus raffinosus
- Erysipelotrichaceae bacterium
- Escherichia albertii
- Escherichia coli
- Escherichia fergusonii
- Eubacterium biforme
- Eubacterium callanderi
- Eubacterium contortum
- Eubacterium cylindroides
- Eubacterium desmolans
- Eubacterium dolichum
- Eubacterium eligens
- Eubacterium hadrum
- Eubacterium hallii
- Eubacterium infirmum
- Eubacterium limosum
- Eubacterium oxidoreducens
- Eubacterium ramulus
- Eubacterium rectale
- Eubacterium ruminantium
- Eubacterium saburreum
- Eubacterium siraeum
- Eubacterium sulci
- Eubacterium tortuosum
- Eubacterium ventriosum
- Eubacterium xylanophilum
- Eubacterium yurii subsp. Margaretiae
- Exiguobacterium mexicanum
- Faecalibacterium prausnitzii
- Faecalitalea cylindroides
- Finegoldia magna
- Flavonifractor plautii
- Flintibacter butyricus
- Fusicatenibacter saccharivorans
- Fusobacterium gonidiaformans
- Fusobacterium mortiferum
- Fusobacterium nucleatum
- Fusobacterium ukerans
- Fusobacterium varium
- Gardnerella vaginalis
- Gemella haemolysans
- Gemella sanguinis
- Gemmiger formicilis
- Gluconacetobacter sp
- Gluconobacter sp
- Gordonibacter pamelaeae
- Granulicatella adiacens
- Grimontia hollisae
- Haemophilus parainfluenzae
- Harryflintia acetispora
- Helicobacter bilis
- Helicobacter bizzozeronii
- Helicobacter canadensis
- Helicobacter cinaedi
- Helicobacter pullorum
- Helicobacter pylori
- Helicobacter winghamensis
- Holdemanella biformis
- Holdemania filiformis
- Holdemania massiliensis
- Hungatella effluvii
- Hungatella hathewayi
- Intestinimonas butyriciproducens
- Kineothrix alysoides
- Kingella oralis
- Klebsiella pneumoniae
- Klebsiella pneumoniae subsp. ozaenae
- Klebsiella pneumoniae subsp. pneumoniae
- Klebsiella pneumoniae subsp. rhinoscleromatis
- Klebsiella quasipneumoniae subsp. quasipneumoniae
- Klebsiella singaporensis
- Klebsiella variicola
- Lachnobacterium bovis
- Lachnospira multipara
- Lachnospira pectinoschiza
- Lactobacillus acidophilus
- Lactobacillus amylolyticus
- Lactobacillus amylovorus
- Lactobacillus antri
- Lactobacillus brevis subsp. Gravesensis
- Lactobacillus buchneri
- Lactobacillus casei
- Lactobacillus coryniformis subsp. Coryniformis
- Lactobacillus crispatus
- Lactobacillus delbrueckii subsp. Bulgaricus
- Lactobacillus delbrueckii subsp. indicus
- Lactobacillus delbrueckii subsp. Lactis
- Lactobacillus fermentum
- Lactobacillus fructivorans
- Lactobacillus gasseri
- Lactobacillus helveticus
- Lactobacillus hilgardii
- Lactobacillus iners
- Lactobacillus jensenii
- Lactobacillus johnsonii
- Lactobacillus mucosae
- Lactobacillus oris
- Lactobacillus paracasei
- Lactobacillus paracasei subsp. tolerans
- Lactobacillus pentosus
- Lactobacillus plantarum subsp. plantarum
- Lactobacillus reuteri
- Lactobacillus rhamnosus
- Lactobacillus rogosae
- Lactobacillus ruminis
- Lactobacillus salivarius
- Lactobacillus ultunensis
- Lactobacillus vaginalis
- Lactococcus formosensis
- Lactococcus garvieae
- Lactococcus lactis subsp. Cremoris
- Lactococcus lactis subsp. lactis
- Lactonifactor longoviformis
- Laribacter hongkongensis
- Lautropia mirabilis
- Leptotrichia buccalis
- Leptotrichia hofstadii
- Leuconostoc lactis
- Leuconostoc mesenteroides subsp. Cremoris
- Listeria grayi
- Listeria monocytogenes
- Longicatena caecimuris
- Marvinbryantia formatexigens
- Megamonas funiformis
- Megamonas rupellensis
- Megasphaera elsdenii
- Megasphaera indica
- Megasphaera micronuciformis
- Megasphaera paucivorans
- Methanobrevibacter smithii
- Methanomassiliicoccus luminyensis
- Methanosphaera stadtmanae
- Methylobacterium radiotolerans TABLE 5-continued Exemplary Microbial Strains Found in Human Gut Microbiome

- Mitsuokella jalaludinii
- Mitsuokella multacida
- Mobiluncus mulieris
- Mogibacterium timidum
- Mogibacterium vescum
- Moraxella catarrhalis
- Morganella morganii subsp. morganii
- Murdochiella asaccharolytica
- Mycobacterium abscessus
- Mycobacterium tuberculosis
- Mycoplasma hominis
- Neisseria cinerea
- Neisseria flavescens
- Neisseria macacae
- Neisseria mucosa
- Neisseria sicca
- Neisseria subflava
- Nitrobacter hamburgensis
- Nitrobacter winogradskyi
- Odoribacter laneus
- Odoribacter splanchnicus
- Olsenella profusa
- Olsenella scatoligenes
- Olsenella uli
- Oribacterium sinus
- Oscillibacter ruminantium
- Oscillibacter valericigenes
- Oscillospira guilliermondii
- Oxalobacter formigenes
- Paenibacillus jamilae
- Paenibacillus kribbensis
- Paenibacillus riograndensis
- Paeniclostridium sordellii
- Parabacteroides distasonis
- Parabacteroides goldsteinii
- Parabacteroides gordonii
- Parabacteroides johnsonii
- Parabacteroides merdae
- Paraprevotella clara
- Paraprevotella xylaniphila
- Parasutterella excrementihominis
- Parasutterella secunda
- Parvimonas micra
- Pediococcus acidilactii/
- Pediococcus pentosaceus
- Peptoniphilus duerdenii
- Peptoniphilus grossensis
- Peptoniphilus hardi
- Peptoniphilus indolicus
- Peptostreptococcus anaerobius
- Phascolarctobacterium faecium
- Phascolarctobacterium succinatutens
- Porphyromonas asaccharolytica
- Porphyromonas endodontalis
- Porphyromonas gingivalis
- Prevotella bivia
- Prevotella buccae
- Prevotella copri
- Prevotella disiens
- Prevotella marshii
- Prevotella melaninogenica
- Prevotella nigrescens
- Prevotella pallens
- Prevotella salivae
- Prevotella stercorea
- Prevotella tannerae
- Prevotella timonensis
- Propionibacterium acnes
- Propionibacterium avidum
- Propionibacterium namnetense
- Proteus mirabilis
- Proteus penneri
- Providencia alcalifaciens
- Providencia rettgeri
- Providencia rustigianii
- Providencia stuartii
- Pseudgflavonifractor capillosus TABLE 5-continued Exemplary Microbial Strains Found in Human Gut Microbiome

- Ralstonia sp.
- Robinsoniella peoriensis
- Roseburia cecicola
- Roseburia faecis
- Roseburia hominis
- Roseburia intestinalis
- Roseburia inulinivorans
- Rothia dentocariosa
- Ruminococcus albus
- Ruminococcus bromii
- Ruminococcus callidus
- Ruminococcus faecis
- Ruminococcus gnavus
- Ruminococcus lactaris
- Ruminococcus obeum
- Ruminococcus torques
- Ruthenibacterium lactatiformans
- Sarcina ventriculi
- Sellimonas intestinalis
- Senegalimassilia anaerobia
- Shigella boydii
- Shigella dysenteriae
- Shigella flexneri
- Shigella sonnei
- Slackia faecicanis
- Slackia isoflavoniconvertens
- Slackia piriformis
- Solobacterium moorei
- Staphylococcus caprae
- Staphylococcus epidermidis
- Staphylococcus hominis subsp. Hominis
- Staphylococcus lugdunensis
- Staphylococcus warneri
- Streptococcus agalactiae
- Streptococcus anginosus
- Streptococcus anginosus subsp. whileyi
- Streptococcus australis
- Streptococcus bovis
- Streptococcus constellatus subsp. constellatus
- Streptococcus equinus
- Streptococcus gallolyticus subsp. pasteuri
- Streptococcus gallolyticus subsp. pasteurianus
- Streptococcus gordonii
- Streptococcus gordonii str. Challis
- Streptococcus infantarius
- Streptococcus infantarius subsp. coli
- Streptococcus infantarius subsp. Infantarius
- Streptococcus infantis
- Streptococcus lactarius
- Streptococcus lutetiensis
- Streptococcus mutans
- Streptococcus parasanguinis
- Streptococcus pasteurianus
- Streptococcus pleomorphus
- Streptococcus rubneri
- Streptococcus salivarius
- Streptococcus salivarius subsp. salivarius
- Streptococcus sanguinis
- Streptococcus thermophilus
- Streptococcus vestibularis
- Subdoligranulum variabile
- Succinatimonas hippei
- Sutterella parvirubra
- Sutterella stercoricanis
- Sutterella wadsworthensis
- Terrisporobacter glycolicus
- Turicibacter sanguinis
- Ureaplasma parvum
- Vagococcus penaei
- Varibaculum cambriense
- Veillonella sp.
- Veillonella dispar
- Veillonella parvula
- Veillonella rogosae

TABLE 5-continued

Exemplary Microbial Strains Found in Human Gut Microbiome

*Veillonella tobetsuensis*
*Vibrio cholerae*
*Vibrio furnissii*
*Vibrio mimicus*
*Victivallis vadensis*
*Weissella cibaria*
*Weissella confusa*
*Weissella paramesenteroides*
*Xenorhabdus nematophila*
*Yersinia enterocolitica* subsp. *Palearctica*
*Yersinia pseudotuberculosis*

In some embodiments, a composition provided herein comprises *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis, Acidaminococcus* sp., or a combination thereof. In some embodiments, a composition comprises at least two of, at least three of, at least four of, at least five of, at least six of, at least seven of, at least eight of, at least nine of, or all of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp. In some embodiments, for example, a composition comprises all of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp., and may be referred to by different names, including but not limited to, CT10 composition, CT10 cocktail, and so forth.

In some embodiments, an individual microbial strain or combinations of microbial strains from a mammalian microbiome that have been killed (e.g., heat killed). Alternatively, in some embodiments, an individual microbial strain or combinations of microbial strains from a mammalian microbiome may include cells that are viable or alive.

In some embodiments, one or more microbial strains comprise a viable or living individual microbial strain or combinations of microbial strains, e.g., from a mammalian microbiome.

In some embodiments, one or more microbial strains comprise a viable or living individual microbial strain or combinations of microbial strains, e.g., from a mammalian microbiome, as described herein comprises and/or is formulated through use of one or more cell cultures and/or supernatants or pellets thereof, and/or a powder formed therefrom.

In some embodiments, compositions for use in accordance with the present disclosure are pharmaceutical compositions, e.g., for administration (e.g., oral administration) to a mammal (e.g., a human). Pharmaceutical compositions typically include an active agent (e.g., individual microbial strains or combinations of microbial strains from a mammalian microbiome, extracts thereof, and/or components thereof), and a pharmaceutically acceptable carrier. Certain exemplary pharmaceutically acceptable carriers include, for instance saline, solvents, dispersion media, coatings, antibacterial and antifungal agents, isotonic and absorption delaying agents, and the like, compatible with pharmaceutical administration.

In some embodiments, a pharmaceutical composition for use in accordance with the present disclosure may include and/or may be administered in conjunction with, one or more supplementary active compounds; in certain embodiments, such supplementary active agents can include ginger, curcumin, probiotics (e.g, probiotic strains of one or more of the following genera: *Lactobacillus, Bifidobacterium* sp., *Saccharomyces, Enterococcus, Streptococcus, Pediococcus, Leuconostoc, Bacillus*, and/or *Escherichia coli* (see Fijan, Int J Environ Res Public Health. 2014 May; 11(5): 4745-4767, which is incorporated herein by reference); prebiotics (nondigestible food ingredients that help support growth of probiotic bacteria, e.g., fructans such as fructooligosaccharides (FOS) and inulins, galactans such as galactooligosaccharides (GOS), dietary fibers such as resistant starch, pectin, beta-glucans, and xylooligosaccharides (Hutkins et al., Curr Opin Biotechnol. 2016 February; 37: 1-7, which is incorporated herein by reference) and combinations thereof.

Pharmaceutical compositions are typically formulated to be compatible with its intended route of administration. Examples of routes of administration include oral administration. Methods of formulating suitable pharmaceutical compositions are known in the art, see, e.g., *Remington: The Science and Practice of Pharmacy*, 21st ed., 2005; and the books in the series *Drugs and the Pharmaceutical Sciences: a Series of Textbooks and Monographs* (Dekker, N.Y.). Oral compositions generally include an inert diluent or an edible carrier. To give but a few examples, in some embodiments, an oral formulation may be or comprise a syrup, a liquid, a tablet, a troche, a gummy, a capsule, e.g., gelatin capsules, a powder, a gel, a film, etc.

In some embodiments, pharmaceutically compatible binding agents, and/or adjuvant materials can be included as part of a pharmaceutical composition. In some particular embodiments, a pharmaceutical composition can contain, e.g., any one or more of the following inactive ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring. In some embodiments, the compositions can be taken as-is or sprinkled onto or mixed into a food or liquid (such as water). In some embodiments, a composition that may be administered to mammals as described herein may be or comprise an ingestible item (e.g., a food or drink) that comprises (e.g., is supplemented) with an individual microbial strain or combinations of microbial strains from a mammalian microbiome, extracts thereof, and/or components thereof.

In some embodiments, a food can be or comprise one or more of bars, candies, baked goods, cereals, salty snacks, pastas, chocolates, and other solid foods, as well as liquid or semi-solid foods including yogurt, soups and stews, and beverages such as smoothies, shakes, juices, and other carbonated or non-carbonated beverages. In some embodiments, foods are prepared by a subject by mixing in individual microbial strains or combinations of microbial strains from a mammalian microbiome, extracts thereof, and/or components thereof.

Compositions can be included in a kit, container, pack, or dispenser, together with instructions for administration or for use in a method described herein.

Those skilled in the art, reading the present disclosure, will appreciate that, in some embodiments, a composition (e.g., a pharmaceutical composition) as described herein may be or comprise one or more cells, tissues, or organisms (e.g., plant or microbe cells, tissues, or organisms) that produce (e.g., have produced, and/or are producing) a relevant compound.

Those skilled in the art will appreciate that, in some embodiments, technologies for preparing compositions and/or preparations, and/or for preparing (and particularly for preparing pharmaceutical compositions) may include one or more steps of assessing or characterizing a compound, preparation, or composition, e.g., as part of quality control. In some embodiments, if an assayed material does not meet pre-determined specifications for the relevant assessment, it is discarded. In some embodiments, if such assayed material does meet the pre-determined specifications, then it continues to be processed as described herein.

In some embodiments, a pharmaceutical composition provided herein can promote the colonization of an individual microbial strain or combinations of microbial strains from a mammalian microbiome, particularly microbial strain(s) that have been identified, characterized, or assessed as decreasing the severity or incidence of a mammalian disease or condition, in a mammal suffering from or at risk of the mammalian disease or condition. In some embodiments, a pharmaceutical composition provided herein can attenuate the colonization of an individual microbial strain or combinations of microbial strains from a mammalian microbiome, particularly microbial strain(s) that have been identified, characterized, or assessed as increasing the severity or incidence of a mammalian disease or condition, in a mammal suffering from or at risk of the mammalian disease or condition. In some embodiments, a pharmaceutical composition provided herein can promote the colonization of an individual microbial strain or combinations of microbial strains from a mammalian microbiome, particularly microbial strain(s) that have been identified, characterized, or assessed as not affecting the severity or incidence of the mammalian disease or condition but have been identified, characterized, or assessed as being capable of outcompeting one or more microbial strains that have been identified, characterized, or assessed as increasing the severity or incidence of a mammalian disease or condition, in a mammal suffering from or at risk of the mammalian disease or condition.

In some embodiments, each of the one or more microbial strains in a composition comprises $10^1$ to $10^{15}$ colony forming units (CFUs). In some embodiments, each of the one or more microbial strains in a composition comprises $10^6$ to $10^{15}$ CFUs. In some embodiments, each of the one or more microbial strains in a composition comprises the same number of CFUs. In some embodiments, some of the one or more microbial strains in a composition comprises a different number of CFUs.

In some embodiments, a composition comprises a total of $10^6$ to $10^{15}$ of CFUs.

In some embodiments, a pharmaceutical composition is tailored to a specific mammal (e.g., a specific human, e.g., a patient) based on that mammal's (e.g., human's) microbiome. In some embodiments, a pharmaceutical composition is specific for a microbiome of an individual mammal (e.g., human). In some embodiments, a pharmaceutical composition is specific for microbiomes of a population of mammals (e.g., humans). Populations of mammals can include, but are not limited to: families, mammals in the same regional location (e.g., neighborhood, city, state, or country), mammals with the same disease or condition, mammals of a particular age or age range, mammals that consume a particular diet (e.g., food, food source, or caloric intake).

Methods of Treatment

The present disclosure recognizes that compositions described herein can be useful in the treatment of subjects. Methods provided by the present disclosure include methods for the treatment of certain diseases, disorders and conditions. In some embodiments, relevant diseases, disorders and conditions may be or include a neurodegenerative disease, disorder, or condition. In some embodiments, a neurodegenerative disease, disorder, or condition may be Alzheimer's disease. In some embodiments, relevant diseases, disorders and conditions may be or include an ocular neovascular disease, disorder, or condition. In some embodiments, a neurodegenerative disease, disorder, or condition may be diabetic retinopathy, retinopathy of prematurity, age-related macular degeneration, or glaucoma.

Generally, methods of treatment provided by the present disclosure involve administering a therapeutically effective amount of a composition as described herein alone or in combination with other compositions and/or treatments to a subject who is in need of, or who has been determined to be in need of, such treatment.

In some embodiments, methods of treatment provided herein are prophylactic or preventative, e.g., may be administered to subjects prior to display of significant symptoms and/or to exposure to a particular expected inducement that is associated with neurodegenerative diseases, disorders, or conditions. In some embodiments, methods of treatment provided herein are therapeutic, e.g., may be administered to subjects after development of significant symptoms associated with neurodegenerative diseases, disorders, or conditions.

In some embodiments, provided methods of treatment are administered to a subject that is a mammal, e.g., a mammal that experiences a disease, disorder, or condition as described herein; in some embodiments, a subject is a human or non-human veterinary subject, e.g., an ape, cat dog, monkey, or pig.

In many embodiments, treatment involves ameliorating at least one symptom of a disease, disorder, or condition associated with neurodegenerative diseases, disorders, or conditions. In some embodiments, a method of treatment can be prophylactic.

In some embodiments, the methods can include administration of a therapeutically effective amount of compositions disclosed herein before, during (e.g., concurrently with), or after administration of a treatment that is expected to be associated with neurodegenerative diseases, disorders, or conditions.

In some embodiments, subjects who receive treatment as described herein may be receiving and/or may have received other treatment (e.g., pharmacological treatment/therapy, surgical, etc), for example that may be intended to treat one or more symptoms or features of a disease disorder or condition as described herein (e.g. neurodegenerative diseases, disorders, or conditions), so that provided compositions are administered in combination with such other therapy (i.e. treatment) to treat the relevant disease, disorder, or condition.

In some embodiments, the compositions described herein can be administered in a form containing one or more pharmaceutically acceptable carriers. Suitable carriers have been described previously and vary with the desired form and mode of administration of a composition. For example, pharmaceutically acceptable carriers can include diluents or excipients such as fillers, binders, wetting agents, disintegrators, surface-active agents, glidants, and lubricants. Typically, a carrier may be a solid (including powder), liquid, or any combination thereof. Each carrier is preferably "acceptable" in the sense of being compatible with other ingredients in the composition and not injurious to a subject. A carrier can be biologically acceptable and inert (e.g., it permits the composition to maintain viability of the biological material until delivered to the appropriate site).

Tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, primogel, or corn starch; a lubricant such as magnesium stearate or sterotes; a glidant such as colloidal silicon dioxide; a sweetening agent such as sucrose or saccharin; or a flavoring agent such as peppermint, methyl salicylate, orange flavoring, or other suitable flavorings. These are for purposes of example only and are not intended to be limiting.

Oral compositions can include an inert diluent or an edible carrier. For purposes of oral therapeutic administration, an active compound can be incorporated with excipients and used in the form of tablets, lozenges, pastilles, troches, or capsules, e.g., gelatin capsules. Oral compositions can also be prepared by combining a composition of the present disclosure with a food. In some embodiments, microbes can be formulated in a food item. Some non-limiting examples of food items to be used with the methods and compositions described herein include: popsicles, cheeses, creams, chocolates, milk, meat, drinks, pickled vegetables, kefir, miso, sauerkraut, etc. In other embodiments, food items can be juices, refreshing beverages, tea beverages, drink preparations, jelly beverages, and functional beverages; alcoholic beverages such as beers; carbohydrate-containing foods such as rice food products, noodles, breads, and pastas; paste products such as fish, hams, sausages, paste products of seafood; retort pouch products such as curries, food dressed with a thick starchy sauce, and Chinese soups; soups; dairy products such as milk, dairy beverages, ice creams, and yogurts; fermented products such as fermented soybean pastes, fermented beverages, and pickles; bean products; various confectionery products including biscuits, cookies, and the like, candies, chewing gums, gummies, cold desserts including jellies, cream caramels, and frozen desserts; instant foods such as instant soups and instant soy-bean soups; and the like. It is preferred that food preparations not require cooking after admixture with microbial strain(s) to avoid killing any microbes. In one embodiment a food used for administration is chilled, for example, iced flavored water. In certain embodiments, the food item is not a potentially allergenic food item (e.g., not soy, wheat, peanut, tree nuts, dairy, eggs, shellfish or fish). Pharmaceutically compatible binding agents, and/or adjuvant materials can be included as part of the composition.

In some such embodiments, a composition described herein is administered to a subject according to a dosing regimen that achieves population of the subject's microbiome with administered cells. In some embodiments, a composition is administered to a subject in a single dose. In some embodiments, a composition is administered to a subject in a plurality of doses. In some embodiments, a dose of a composition is administered to a subject twice a day, daily, weekly, or monthly.

In some embodiments, each of the one or more microbial strains in a dose comprises $10^1$ to $10^{15}$ colony forming units (CFUs). In some embodiments, each of the one or more microbial strains in a dose comprises $10^6$ to $10^{15}$ CFUs. In some embodiments, each of the one or more microbial strains in a dose comprises the same number of CFUs. In some embodiments, some of the one or more microbial strains in a dose comprises a different number of CFUs.

In some embodiments, a dose of one or more microbial strains comprises a total of $10^6$ to $10^{15}$ CFUs. In some embodiments, a dose of one or more microbial strains comprises a total of $10^7$ to $10^{15}$ CFUs. In some embodiments, a dose of one or more microbial strains comprises 5-200 billion CFUs. In some embodiments, a dose of one or more microbial strains comprises 5-50 billion CFUs. In some embodiments, a dose of one or more microbial strains comprises 5-20 billion CFUs. In some embodiments, a dose of one or more microbial strains comprises 50-100 billion CFUs. In some embodiments, a dose of one or more microbial strains comprises 100-200 billion CFUs.

EXAMPLES

The following examples are provided so as to describe to the skilled artisan how to make and use methods and compositions described herein, and are not intended to limit the scope of the present disclosure.

Example 1: Metabolome Profiles of Mouse Plasma

Purpose of Study: Analyzing the ionic metabolites in the mouse plasma by Capillary Electrophoresis Time-of-Flight Mass Spectrometry (CE-TOFMS).

Summary: Metabolome analysis was performed in 10 samples of mouse plasma using CE-TOFMS in two modes for cationic and anionic metabolites. 196 metabolites (119 metabolites in Cation mode and 77 metabolites in Anion mode) were detected.

Material and Methods:

Materials: Mice were treated with control or treatment (CT10 composition), following which their blood/plasma samples were analyzed for changes in levels of metabolites. 30-50 microliters (depending on the animal body weight) of Phosphate buffered saline (PBS) was used as control. For CT10, $10^6$ CFU of each individual bacterial strain were combined together in PBS and given to animals by oral gavage once a day. The total bacterial concentration was $10^7$ CFU. A metabolome analysis was performed on the samples. The samples are listed in Table 6 below.

TABLE 6

Sample Information

| Name | Group | Dilution (Cation)* | Dilution (Anion)* |
|---|---|---|---|
| 1 | Control (PBS) | 1 | 3 |
| 7 | | 1 | 3 |
| 3 | | 1 | 3 |
| 4 | | 1 | 3 |
| 2 | Treatment (CT10) | 1 | 3 |
| 5 | | 1 | 3 |
| 6 | | 1 | 3 |
| 8 | | 1 | 3 |
| 9 | | 1 | 3 |
| 10 | | 1 | 3 |

*Dilution factors for Measurement

Sample Preparation: Each 50 μL sample was mixed with 200 μL of methanol containing internal standards (20 μM) and mixed. Then, Milli-Q water (150 μL) was added and mixed thoroughly. The solution (300 μL) was filtrated through 5-kDa cut-off filter (ULTRAFREE-MC-PLHCC, Human Metabolome Technologies, Yamagata, Japan) to remove macromolecules. The filtrate was centrifugally concentrated and resuspended in 50 μL of ultrapure water immediately before the measurement.

Measurement: The compounds were measured in the Cation and Anion modes of CE-TOFMS based metabolome analysis in the following conditions). The samples were diluted as shown in Table 6 for the measurement, to improve analysis qualities of the CE-MS analysis.

Cationic Metabolites (Cation Mode)
Device
  Agilent CE-TOFMS system (Agilent Technologies Inc.) Machine No. 3
  Capillary: Fused silica capillary i.d. 50 μm×80 cm
Analytical Condition
  Run buffer: Cation Buffer Solution (p/n: H3301-1001)
  Rinse buffer: Cation Buffer Solution (p/n: H3301-1001)
  Sample injection: Pressure injection 50 mbar, 10 sec
  CE voltage: Positive, 30 kV
  MS ionization: ESI Positive
  MS capillary voltage: 4,000 V
  MS scan range: m/z 50-1,000
  Sheath liquid: HMT Sheath Liquid (p/n: H3301-1020)
Anionic Metabolites (Anion Mode)
Device
  Agilent CE-TOFMS system (Agilent Technologies Inc.) Machine No. 2
  Capillary: Fused silica capillary i.d. 50 μm×80 cm
Analytical Condition
  Run buffer: Anion Buffer Solution (p/n: 13302-1023)
  Rinse buffer: Anion Buffer Solution (p/n: 13302-1023)
  Sample injection: Pressure injection 50 mbar, 22 sec
  CE voltage: Positive, 30 kV
  MS ionization: ESI Negative
  MS capillary voltage: 3,500 V
  MS scan range: m/z 50-1,000
  Sheath liquid: HMT Sheath Liquid (p/n: H3301-1020)
Data Processing and Analysis:

Data Processing: Peaks detected in CE-TOFMS analysis were extracted using automatic integration software (MasterHands ver. 2.17.1.11 developed at Keio University) in order to obtain peak information including m/z, migration time (MT), and peak area. The peak area was then converted to relative peak area by the following equation. The peak detection limit was determined based on signal-noise ratio; S/N=3.

$$\text{Relative Peak Area} = \frac{\text{Metabolite Peak Area}}{\text{Internal Standard Peak Area} \times \text{Sample Amount}}$$

Annotation of Peaks: Putative metabolites were then assigned from HMT's standard library and Known-Unknown peak library on the basis of m/z and MT. The tolerance was ±0.5 min in MT and ±10 ppm (mass error calculated using formula below) in m/z. If several peaks were assigned the same candidate, the candidate was given the branch number.

$$\text{Mass error (ppm)} = \frac{\text{Measured Value} - \text{Theoretical Value}}{\text{Measured value}} \times 10^6$$

Quantitative Estimation of Target Metabolites: Absolute quantification was performed in target metabolites. All the metabolite concentrations were calculated by normalizing the peak area of each metabolite with respect to the area of the internal standard and by using standard curves, which were obtained by single-point (100 μM or 50 μM) calibrations.

Statistical Analysis (PCA, HCA): Hierarchical cluster analysis (HCA) and principal component analysis (PCA) were performed by statistical analysis software (developed at HMT). The analysis results were shown in the attached Excel file in detail.

Plotting on Pathway Map: The profile of peaks with putative metabolites were represents on metabolic pathway maps using VANTED (Visualization and Analysis of Networks containing Experimental Data) 4) software. The abbreviations of some metabolites used in the pathway map are different from those in the HMT's standard library (Appendix 1). The pathway map was prepared based on the metabolic pathways that are known to exist in human cells.

Results:

Putative Metabolites: From CE-TOFMS measurement, 196 peaks (119 in Cation and 77 in Anion Mode, respectively) were detected and annotated (Table 7).

Comparative Analysis between Study Groups: For detected 196 peaks, the results are summarized in Table 7.

Quantitative Estimation of Target Metabolites: Among target metabolites, 64 metabolites (40 in Cation and 24 in Anion Mode, respectively) were detected and quantified (Table 8).

Figure 6:
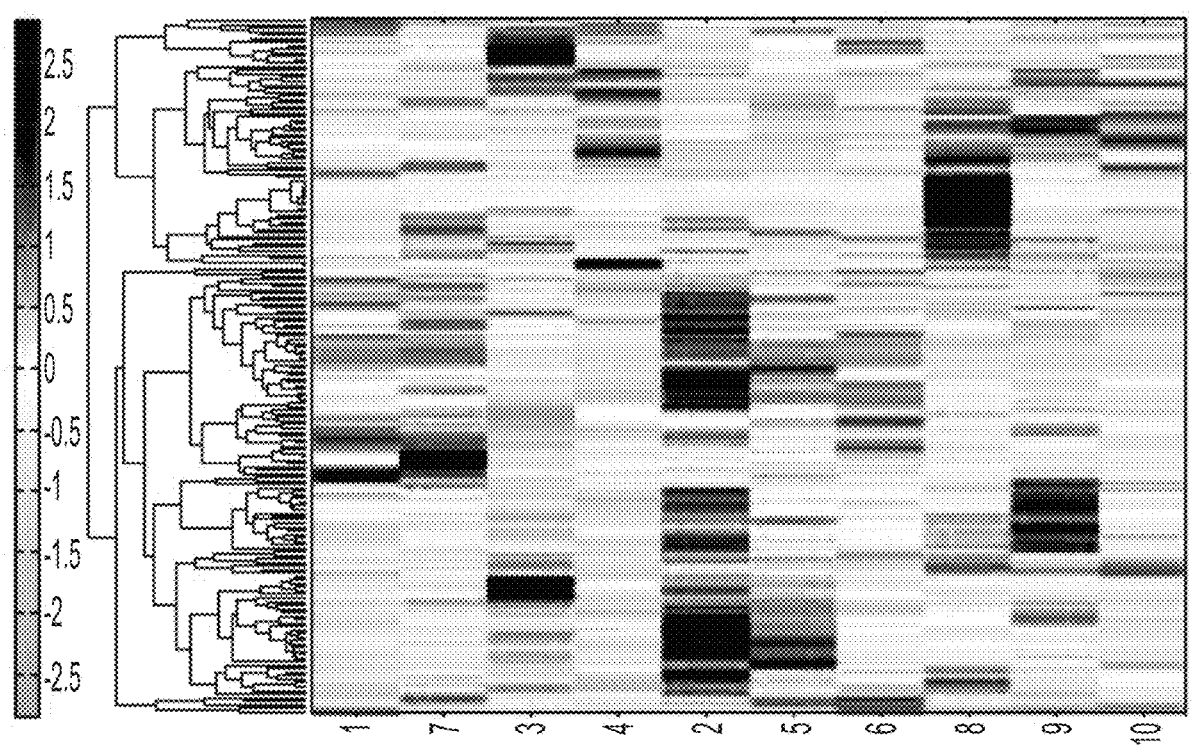
FIG. 6 includes data showing the detected hierarchical cluster analysis (HCA) results. The horizontal axis and vertical axis show sample names and peaks. HCA was performed in peak. The distances between peaks were then displayed in tree diagrams. The heatmap includes normalized detection values in HCA as heatmap.
Figure 7:
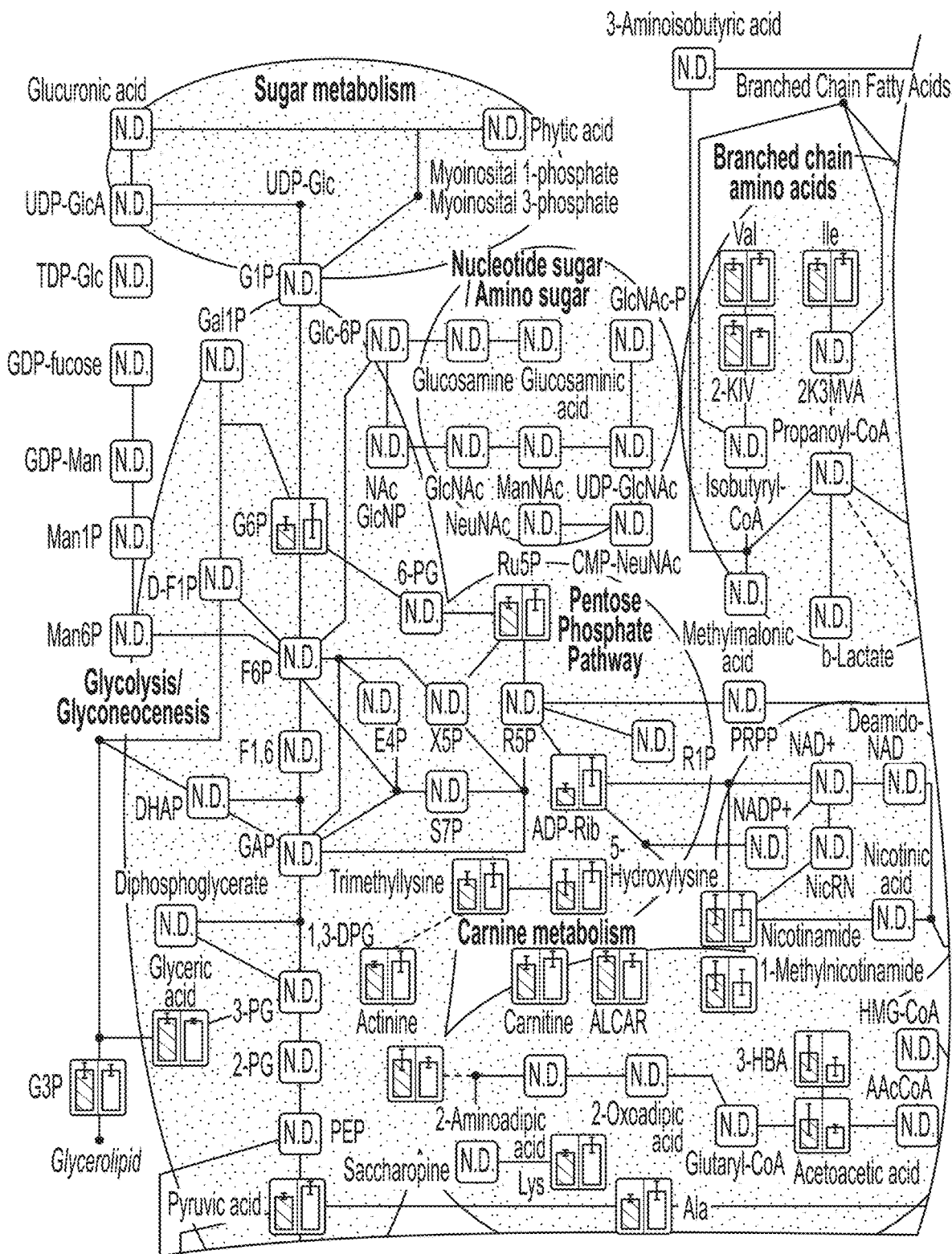
FIG. 7 shows an exemplary Pathway Map (Primary metabolism overview). Detected metabolites in this study were plotted on a pathway map. The bars/lines represent relative areas of each metabolite in control (blue), treatment (red), respectively. N.D. indicates that a metabolite was not detected.
Figure 8:
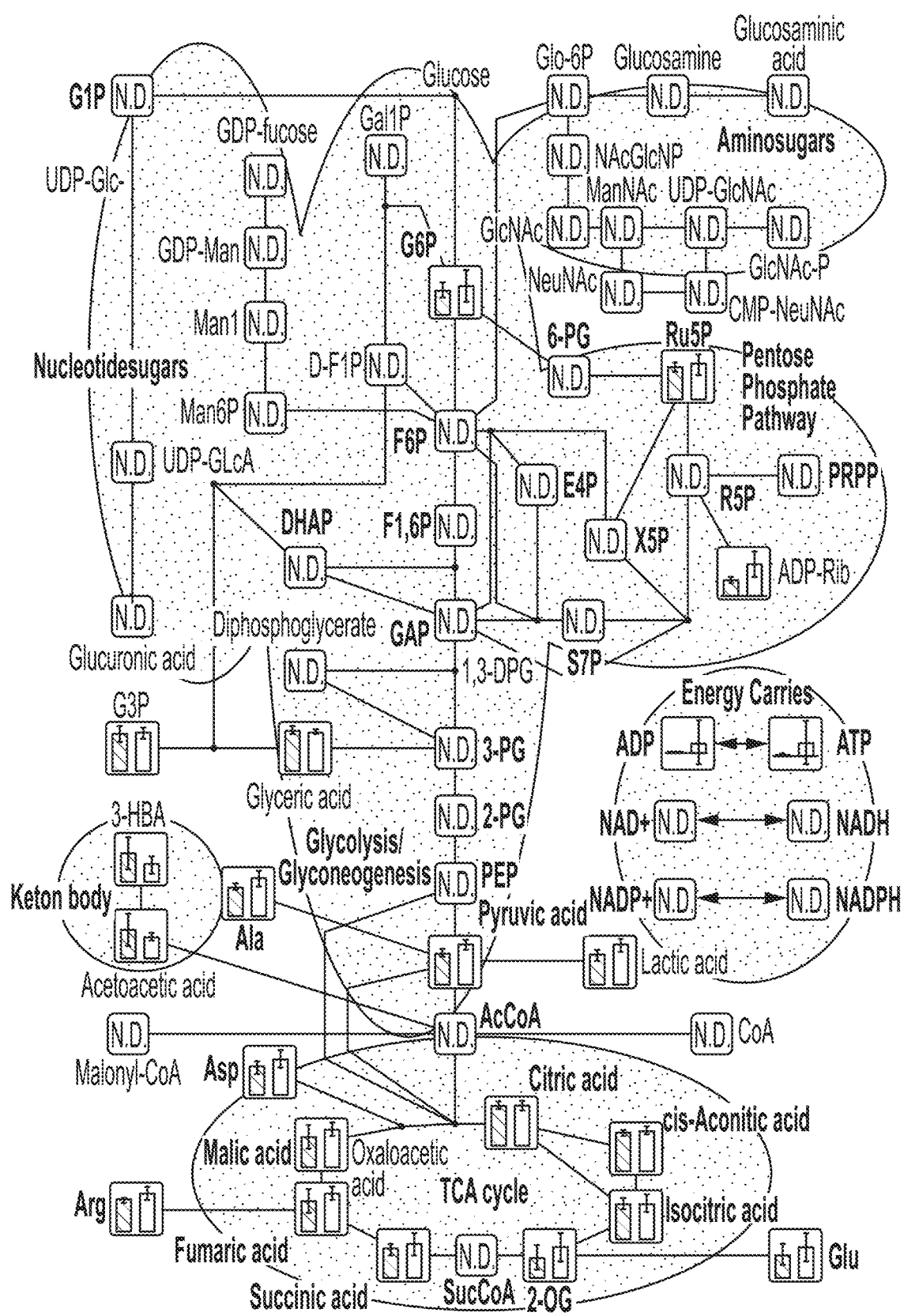
FIG. 8 shows an exemplary Pathway Map (Central Carbon Metabolism). Detected metabolites in this study were plotted on a pathway map. The bars/lines represent relative areas of each metabolite in control (blue), treatment (red), respectively. N.D. indicates that a metabolite was not detected.
Figure 9:
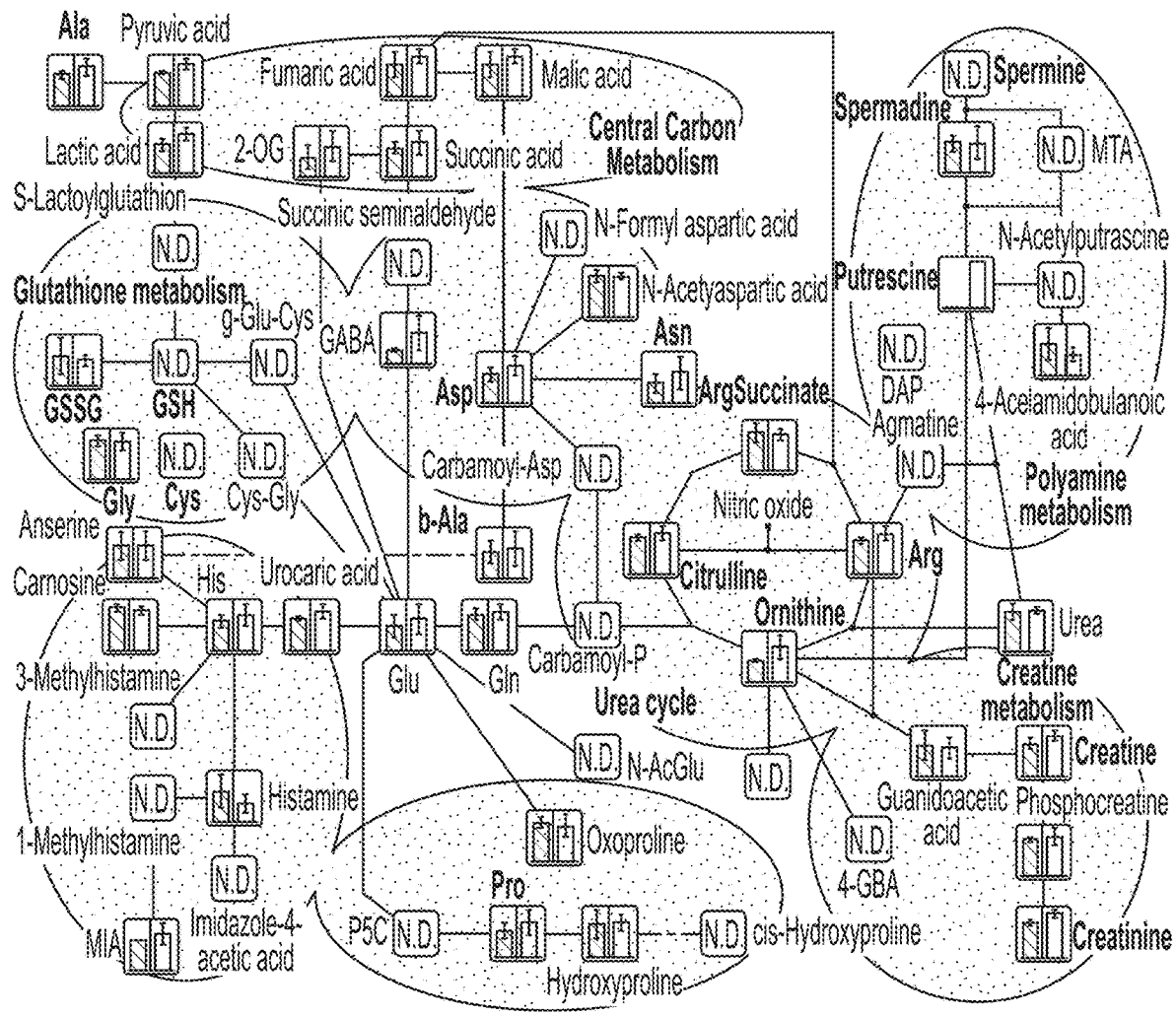
FIG. 9 shows an exemplary Pathway Map (Urea Cycle Relating Metabolism). Detected metabolites in this study were plotted on a pathway map. The bars/lines represent relative areas of each metabolite in control (blue), treatment (red), respectively. N.D. indicates that a metabolite was not detected.
Figure 10:
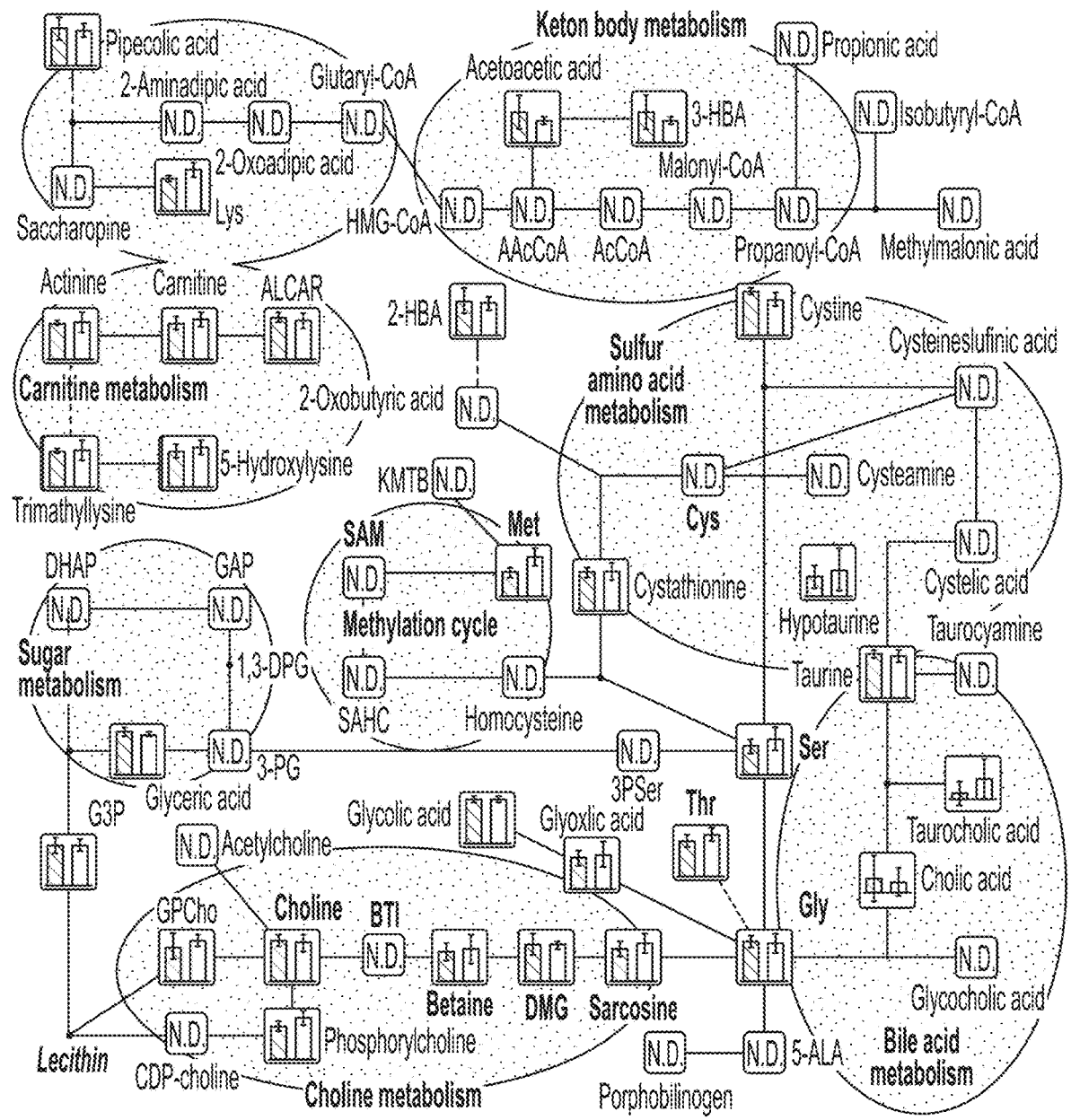
FIG. 10 shows an exemplary Pathway Map (Lipid and Amino Acid Metabolism). Detected metabolites in this study were plotted on a pathway map. The bars/lines represent relative areas of each metabolite in control (blue), treatment (red), respectively. N.D. indicates that a metabolite was not detected.
Figure 11:
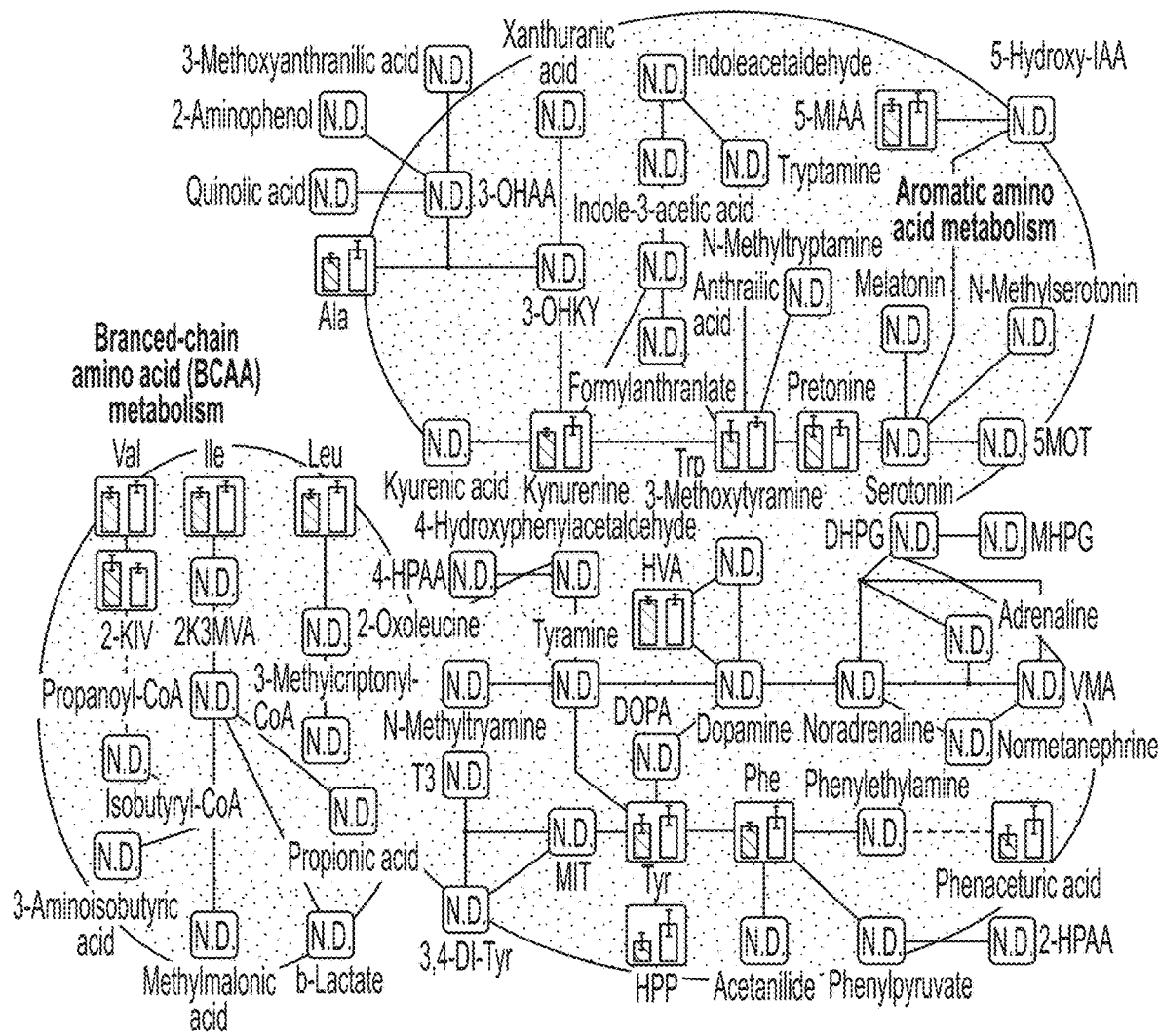
FIG. 11 shows an exemplary Pathway Map (Branched Chain and Aromatic Amino Acids). Detected metabolites in this study were plotted on a pathway map. The bars/lines represent relative areas of each metabolite in control (blue), treatment (red), respectively. N.D. indicates that a metabolite was not detected.
Figure 12:
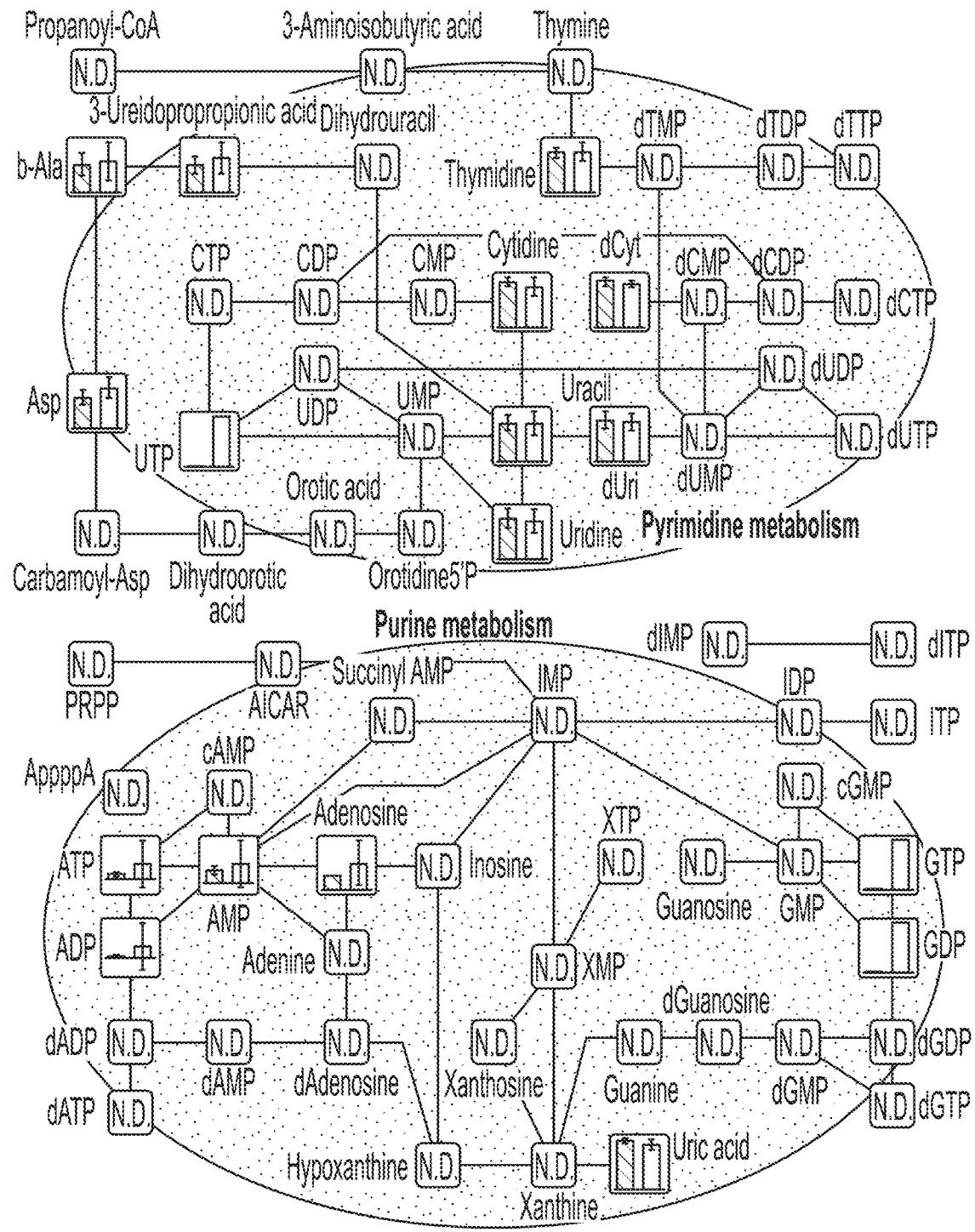
FIG. 12 shows an exemplary Pathway Map (Nucleotide Metabolism). Detected metabolites in this study were plotted on a pathway map. The bars/lines represent relative areas of each metabolite in control (blue), treatment (red), respectively. N.D. indicates that a metabolite was not detected.
Figure 13:
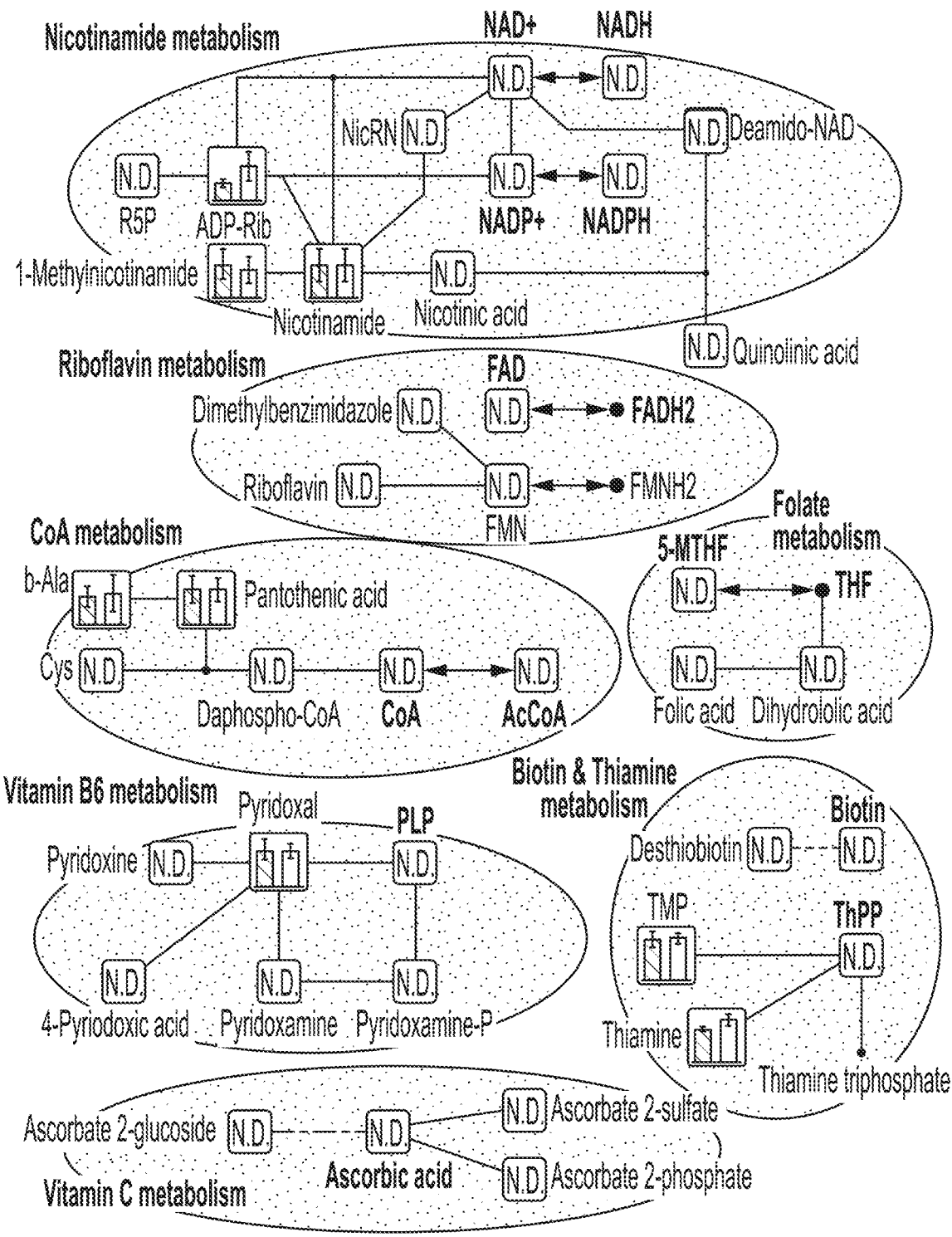
FIG. 13 shows an exemplary Pathway Map (Metabolism of Coenzymes). Detected metabolites in this study are plotted on a pathway map. The bars/lines represent relative areas of each metabolite in control (blue), treatment (red), respectively. indicates that a metabolite was not detected.

Statistical Analysis (PCA, HCA): The PCA result was shown in FIG. 5. The HCA result was displayed using HeatMap (FIG. 6).

Plotting on Pathway Map: Graphs of the obtained metabolome data were created and superimposed on the following metabolic pathway maps: Primary metabolism overview, central carbon metabolism, Urea cycle, lipid metabolism, amino acid metabolism, nucleotide metabolism and metabolism of coenzymes, respectively (FIGS. 7-14).

These results demonstrate that microbiome compositions as disclosed herein modulate the metabolome of mammals (e.g. mice), and may have therapeutic aspects.

Example 2: Characterizing Microbial Strains that Affect One or More Metabolite Levels or a Metabolome Example 2.1: Metabolome Analysis in Mice Treated with One or More Compositions Male and female mice were administered any one of (i) Group I: the CT10 composition, (ii) Group II: lipopolysaccharide (LPS) derived from *E. coli* 0111:B4; (iii) Group III: mock as negative control; and (iv) Group IV: LPS composition followed by the CT10 composition. Each group included 5 animals. For Groups I and IV, $10^6$ CFU of each individual bacterial strain in the CT10 composition was combined together in PBS and given to animals by oral gavage once a day. The total bacterial concentration was therefore $10^7$ CFU. For Groups II and IV, 1 microgram/mL of LPS in PBS was administered by intraperitoneal injection. For Group III, the mock solution was 30 mL of PBS injected intraperitoneally. 24 hours after the injection, the animals were sacrificed to collect the plasma samples.

Metabolome analysis was performed on mouse plasma sample using CE-TOFMS (Agilent Technologies Inc.) in two modes for cationic and anionic metabolites. Levels of 104 metabolites were increased in female mice treated with CT10 composition, while in male mice 88 metabolites levels were increased (see FIG. 1 and FIG. 2, Table 1 and Table 2), relative to the respective metabolite levels in the control/ mock group. Of these metabolites, 19 were increased irrespective of the gender.

Metabolome analysis of each of the 10 microbial species from CT10 cocktail was also conducted. Specifically, for each of the microbial species, metabolome analysis on both cells and their corresponding spent media was conducted. Using this data, the potential origin of each of the metabolites that were increased in the mouse plasma (see FIG. 1 and FIG. 2, Table 1 and Table 2) was mapped. Of the 104 metabolites that increased in the CT10 composition-treated female mouse plasma, 93 metabolites were detected at high levels in at least one bacterium compared to other bacterial species of CT10 composition. In addition, 11 metabolites were not detected in any microbes (see Table 1). It is hypothesized that these metabolites were likely generated in vivo in response to CT10 composition treatment. Analogously, of the 88 metabolites that increased in the CT10 composition-treated male mouse plasma, 74 metabolites were detected at high levels in at least one bacterium compared to other bacterial species of CT10 composition. 75 metabolites are detected at high levels both in male and female treated with CT10 composition.

In addition, metabolome analysis on plasma samples of male and female mice that were administered either mock or LPS compositions were conducted. In response to LPS treatment the levels of 37 metabolites in females and 97 metabolites in males were increased (see FIG. 3 and FIG. 4, Table 3 and Table 4). Of these metabolites, 17 of them were increased in response to LPS injection irrespective of the gender. Of the 37 metabolites whose levels increased in response to LPS injection in female mice, 34 metabolites levels were decreased in group IV which were administered LPS composition and CT10 composition (Table 3). Of the 97 metabolites whose levels increased in response to LPS injection in male mice, 89 metabolites levels were decreased in group IV, which were administered LPS composition and CT10 composition (Table 4).

These results demonstrate that microbiome compositions and/or LPS compositions modulate the metabolome of both male and female mammals (e.g. mice), albeit differently.

OTHER EMBODIMENTS

It is to be appreciated by those skilled in the art that various alterations, modifications, and improvements to the present disclosure will readily occur to those skilled in the art. Such alterations, modifications, and improvements are intended to be part of the present disclosure, and are intended to be within the spirit and scope of the invention. Accordingly, the foregoing description and drawing are by way of example only and any invention described in the present disclosure if further described in detail by the claims that follow.

Those skilled in the art will appreciate typical standards of deviation or error attributable to values obtained in assays or other processes as described herein. The publications, websites and other reference materials referenced herein to describe the background of the invention and to provide additional detail regarding its practice are hereby incorporated by reference in their entireties.

It is to be understood that while embodiments of the invention have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An ingestible item comprising *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp., wherein the ingestible item is a food, beverage, or pharmaceutical composition suitable for human consumption.

2. The ingestible item of claim 1, wherein the composition is a pharmaceutical composition.

3. The ingestible item of claim 1, for use in modulating one or more metabolites in a subject.

4. The ingestible item of claim 1, for use in characterizing the ability of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp. to modulate one or more metabolites in a subject.

5. The ingestible item of claim 1, for use in characterizing the metabolome of a subject.

6. The ingestible item of claim 1, for use in treating or ameliorating a disease, disorder, or condition in a subject, wherein the disease, disorder, or condition is associated with one or more metabolites.

7. The ingestible item of claim 1, further comprising one or more lipopolysaccharides, wherein the one or more lipopolysaccharides is from *E. coli*.

8. The ingestible item of claim 7, wherein the one or more lipopolysaccharides is from *E. coli* 0111.B4.

9. The ingestible item of claim 1, comprising $10^6$ to $10^{15}$ CFUs of each of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp.

10. The ingestible item of claim 1, comprising $10^1$ to $10^{15}$ CFUs of each of *Gluconacetobacter hansenii, Terrisporobacter glycolicus, Coprococcus* sp., *Lactobacillus plantarum, Clostridium butyricum, Paenibacillus* sp., *Veillonella* sp., *Bifidobacterium* sp., *Bacillus subtilis*, and *Acidaminococcus* sp.

* * * * *